United States Patent
Joshi et al.

(10) Patent No.: US 7,694,328 B2
(45) Date of Patent: Apr. 6, 2010

(54) SYSTEMS AND METHODS FOR SECURE CLIENT APPLICATIONS

(75) Inventors: Amit Joshi, San Jose, CA (US); Ananta Iyengar, San Jose, CA (US); Anurag Sharma, Mountain View, CA (US); Finnur Thorarinsson, Stanford, CA (US); Johann Sigurdsson, Montreal (CA); Sanjeev Radhakrishnan, San Jose, CA (US); Sigurdur Asgeirsson, Beaconsfield (CA); Sunil Shilimkar, Pune (IN); Tomas Gunnarsson, Montreal (CA); Wayne Gray, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1170 days.

(21) Appl. No.: 10/971,645

(22) Filed: Oct. 21, 2004

(65) Prior Publication Data

US 2005/0149726 A1    Jul. 7, 2005

Related U.S. Application Data

(60) Provisional application No. 60/512,767, filed on Oct. 21, 2003.

(51) Int. Cl.
*H04L 9/32* (2006.01)

(52) U.S. Cl. ......................................................... 726/2

(58) Field of Classification Search ..................... 726/3, 726/12, 30, 2, 27; 713/166
See application file for complete search history.

(56) References Cited

U.S. PATENT DOCUMENTS

| 5,760,769 A | 6/1998 | Petrie et al. |
|---|---|---|
| 6,772,345 B1 * | 8/2004 | Shetty .......................... 726/24 |
| 6,804,780 B1 * | 10/2004 | Touboul ...................... 713/181 |
| 7,246,374 B1 * | 7/2007 | Simon et al. .................. 726/16 |
| 2002/0019941 A1 * | 2/2002 | Chan et al. ................... 713/185 |
| 2003/0028655 A1 * | 2/2003 | Owhadi ....................... 709/229 |

FOREIGN PATENT DOCUMENTS

WO        WO 98/21683 A    5/1998

* cited by examiner

*Primary Examiner*—Ellen Tran
(74) *Attorney, Agent, or Firm*—Sterne Kessler Goldstein & Fox, P.L.L.C.

(57) ABSTRACT

An innovative security solution which separates a client into a Protected Context, which is the real files and resources of the client, and an Isolated Context, which is a restricted execution environment which makes use of virtualized resources to execute applications and modify content in the Isolated Context, without allowing explicit access to the resources in the Protected Context. The solution further consolidates user interfaces to allow users to seamlessly work with content in both contexts, and provide a visual indication of which display windows are rendered from content executed in the Isolated Context.

58 Claims, 11 Drawing Sheets

SYSTEMS AND METHODS FOR SECURE CLIENT APPLICATIONS

This Non-Provisional Application claims the benefit of priority U.S. Provisional Application No. 60/512,767, filed Oct. 21, 2003, which is incorporated herein by reference.

FIELD OF THE INVENTION

The invention relates to a security solution that can be implemented on a large network, such as an enterprise network.

BACKGROUND OF THE INVENTION

The incidence of worm, virus and Trojan attacks on the internet have been on a sharp rise lately, and enterprises are feeling a non-trivial cost due to these attacks. Even if an enterprise is never directly infected by such an attack, this cost manifests itself in the continuous vigilance required to stay abreast of the attackers, such as by:

Continuously applying patches to workstations.
Keeping virus definition files up to date.
Real-time scanning modified files.
Scanning incoming web content and email attachments.
Loss of productivity due to security measures or protocols, such as blocked web content or email attachments.

As enterprises are continuously trying to maintain the balance between productivity and security, they are in a continuous tradeoff situation, where on the security side there is a constant push to limit the scope of the communications pathways into the enterprise, whereas on the productivity side it is desirable to allow staff access to internet content and unhindered collaboration with their colleagues.

Should an enterprise suffer infection through these attacks, the cost it incurs, and the damage it can suffer ranges widely, depending on the scale of the infection and the actions of the malware. This cost can include:

IT cost in updating virus definition files and scheduling scans, or manually eliminating the infection, workstation by workstation.
Operational crippling, when critical infrastructure such as email servers goes offline due to overload, or staff workstations have to be taken offline pending disinfection.
Financially damaging, such as when sensitive content is disclosed to the attacker or the world at large.

Currently, enterprises maintain security using a variety of methodologies, including anti-virus (AV) scanners, behavior analysis systems, restricted computing environments, and intrusion detection systems. However the current methods used to maintain enterprise security suffer from a variety of problems make them less than ideal solutions for effectively protecting an enterprise from malware.

By far the most serious problem with AV products is their inability to protect against unknown viruses. This allows new viruses a time window for rapid spreading and destruction, before AV software can be adapted and client hosts updated to test for their existence and stop the spreading.

The inability of AV products of protecting against unknown viruses creates the need for continuously updating the AV patterns files and software. This puts a strain on IT resources, network resources and computing hardware.

Furthermore, in order to maintain sufficient vigilance, most AV products provide real-time scanning, which scans all files when they're opened, and upon modification. While this has security benefits, it also has the downside of serious performance degradation.

Behavior analysis systems look at the behavior of content to determine whether the content is malicious or benign. These systems typically execute the content, either in a sandbox of some sort or under interpretation and monitor the actions it performs. Any content that performs actions which can be construed as malicious, such as modifying system configuration, modifying or replacing system or application executables, and so on, will be classified as malicious and most likely denied entry to the enterprise network.

However, these types of systems suffer from the major shortcoming that they exhibit a high percentage of both false positives and false negatives. As an example, system updates and application installers would surely classify as malicious, while, say an ActiveX control that performed malicious activity only after having been used a number of times, or for a long period of time, might evade the malicious classification.

Restricted computing environments place restrictions on the computing environment of staff within an enterprise by limiting the content that can be accessed. Access to the world wide web is often limited, whether in the set of web sites available, or in the type of content allowed. Limitations are placed on email access, most frequently in the type and size of emails and attachments allowed. General limitations are placed on access to other internet services and applications, such as Instant Messaging, file sharing services and the like. Further limitations can be placed on where documents can be saved, and quotas on the amount of storage available to users.

These restrictions can have the major shortfall of curtailing the productivity by limiting the range of activities available to users. These measures are also not failsafe, since the type of content allowed through filters often must include such things as office documents, portable document files (pdfs) and the like. This coupled with the fact that viruses can propagate through many document types, plus the fact that the applications handling the documents are also prone to vulnerabilities that can be exploited through malformed content, makes those measures not very effective.

Intrusion detection systems typically have a focus on trying to detect intrusions that have already occurred, or intrusions in progress. These types of systems may suffer from false positives, and also may have very little potential for prevention. Because these systems depend on monitoring activity on the network to infer whether an intrusion is in progress, they may interpret many sorts of unusual activity as a potential intrusion. As a case in point, monitoring email activity with a trigger on the amount of traffic generated might be triggered if a particularly important memo or good joke starts making the rounds on the enterprise network.

However, intrusion detection systems have very little prevention potential. While it is useful to receive notification of an intrusion, the fact is that once an intrusion has occurred, much of the damage has already been done. Once a viral or worm infection has taken hold, there's no way around the fact that the infection will have damaged system files and configuration, and that there is a cost to undoing this damage.

It is accordingly a primary object of the invention to allow enterprise users unfettered access to external, potentially malicious content, such as web pages, externally originated email and email attachments, while protecting the enterprise from malicious attacks by this same content.

This is achieved by the novel method of transparent isolation, which identifies the origin of the content, and persistently tags external content with its origin. Such external content can then be executed in an isolated environment, which mediates access to all resources on the local host, and to the resources and content exposed on the internal enterprise network.

SUMMARY OF THE INVENTION

In accordance with the invention, the goal of the novel security solution is to allow enterprise users unfettered access to external, potentially malicious content, such as web pages, externally originated email and attachments, without exposing the enterprise to the risk of infection or other malicious action. In order to minimize impact on users' productivity, this can be performed with minimal impact on the computing experience of the security solution users through transparent isolation.

The security solution is designed to fully prevent an enterprise from being attacked by a compromise of system or application executables, where executables are altered, new executable introduced, and/or system configuration modified for sinister purposes, which can result in viral infection or introduction of worms, Trojans or spyware. Compromise of system configuration where registry values or configuration files are maliciously modified, which can lead to denial of service by rendering workstations unusable, and the introduction of false or misleading information, e.g. by redirecting web browsing through a proxy server on the attackers site. Disclosure of confidential information, e.g. by redirecting outgoing email traffic to an external server. Compromise of internal content, where content is altered, which can result in either a direct loss of data, or the introduction of wrong or misleading data substituted for trusted, legitimate content, which in turn can lead to embarrassment or a direct financial loss to the enterprise. Compromise of other hosts on the internal network, which can lead to "wildfire" propagation of attacks across the internal enterprise network. Workstation denial of service, where a significant portion of the computing resources of the local workstations are either put out of commission, or consumed by malicious activity, which prevents enterprise users from performing productive work. Disclosure of confidential content or data, where confidential content or data is disclosed, either to the attacker, which could use it for his or her own financial gain, or to the population at large which may cause anywhere between embarrassment to a direct financial loss to the enterprise. Social engineering attacks, where malicious content manipulates users into divulging sensitive information, such as credentials, e.g. by masquerading as legitimate password dialogs, which can lead to breach of enterprise security and from there to further trouble.

The method of transparent isolation seeks to prevent these attacks by the following: identifying the content origins; persistently tagging the external content with its origin; creating a restricted virtualized execution environment, where data and resources can be separated into virtual environments through on-demand reflection or namespace separation, access to local and internal enterprise network resources can be mediated, providing the restricted execution environment with mediated access to selected services in order to allow execution of unmodified applications; consolidating user interfaces to allow users to seamlessly work with untrusted content; providing a visual indication of which display windows are rendered from untrusted content; and discerning between programmatic and explicit user action, ideally through secure means.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

DESCRIPTION OF THE EMBODIMENTS

Reference will now be made in detail to the exemplary embodiments of the invention, example of which are illustrated in the accompanying drawings. Wherever possible, the same reference numbers will be used throughout the drawings to refer to the same or like parts.

The invention is directed to an innovative security solution which separates a client into a Protected Context, which is the real files and resources of the client, and an Isolated Context, which is a restricted execution environment which makes use of virtualized resources to execute applications and modify content in the Isolated Context, without allowing explicit access to the resources in the Protected Context.

Figure 1:
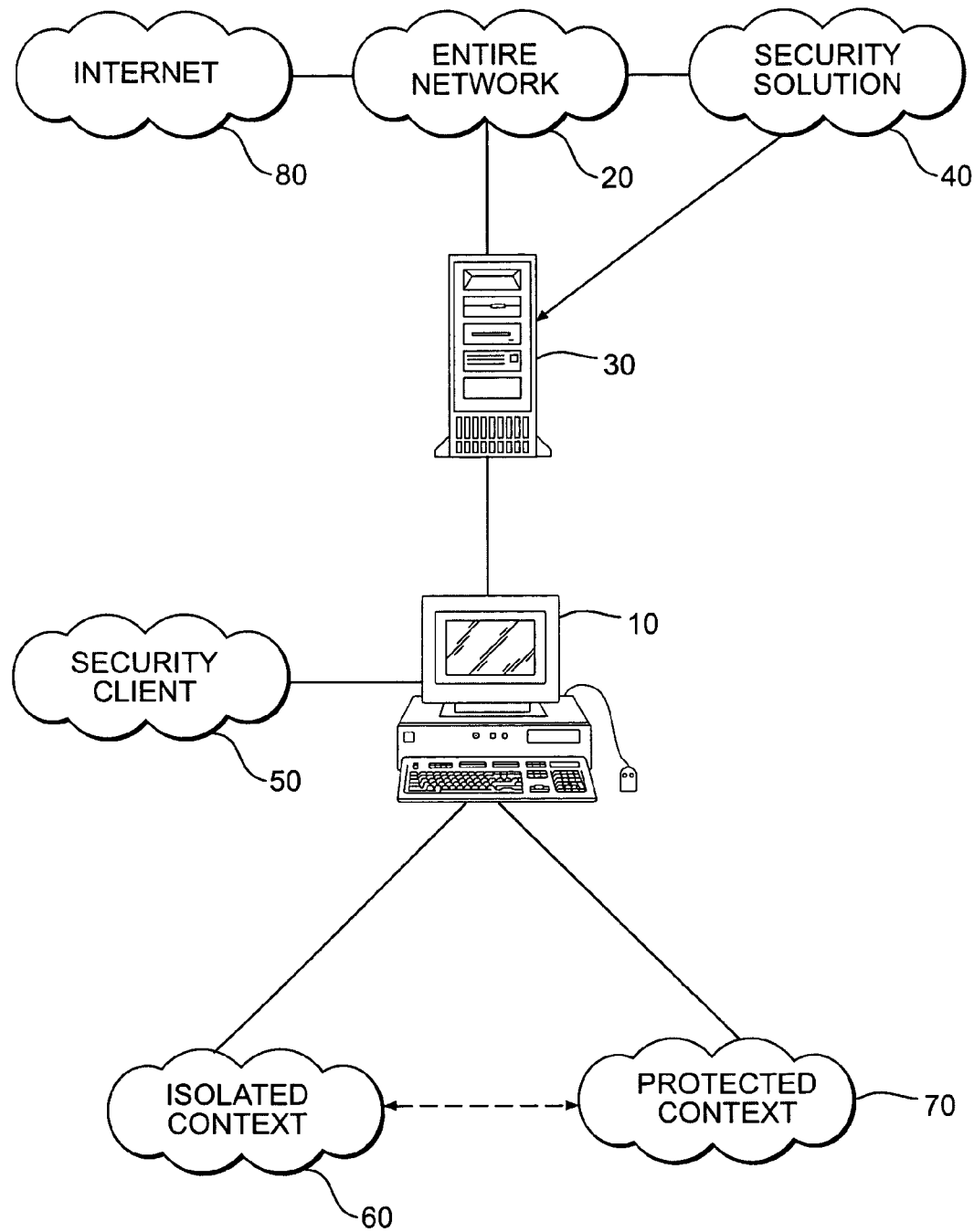
FIG. 1 is a conceptualization of the security solution according to the preferred embodiment.

FIG. 1 shows a conceptual chart of how this is implemented. The client 10 is part of the enterprise network 20, connected by one of a plurality of enterprise servers 30. The network is freely connected to the internet 80. Installed on the network, is the security solution 40, which provides general policy based definitions to the servers for identifying external content, and tagging the content. Installed on the client is the security solution security client software 50, which provides local policies and mechanisms for identifying the origin of content, tagging mechanisms, and means for creating restricted execution environments, virtual environments, and for consolidating the user interface, providing a visual indication of untrusted content and detecting user intent. The combination of the security client 50 and the security server 40 allow the user environment on the client 10 to be separated into to environments, or contexts, a Isolated Context 60, and a Protected Context 70. The Isolated Context 60 has mediated access to the resources of the Protected Context 70 to allow the operation of content to be executed in the restricted execution environment of the Isolated Context 60.

Figure 2:
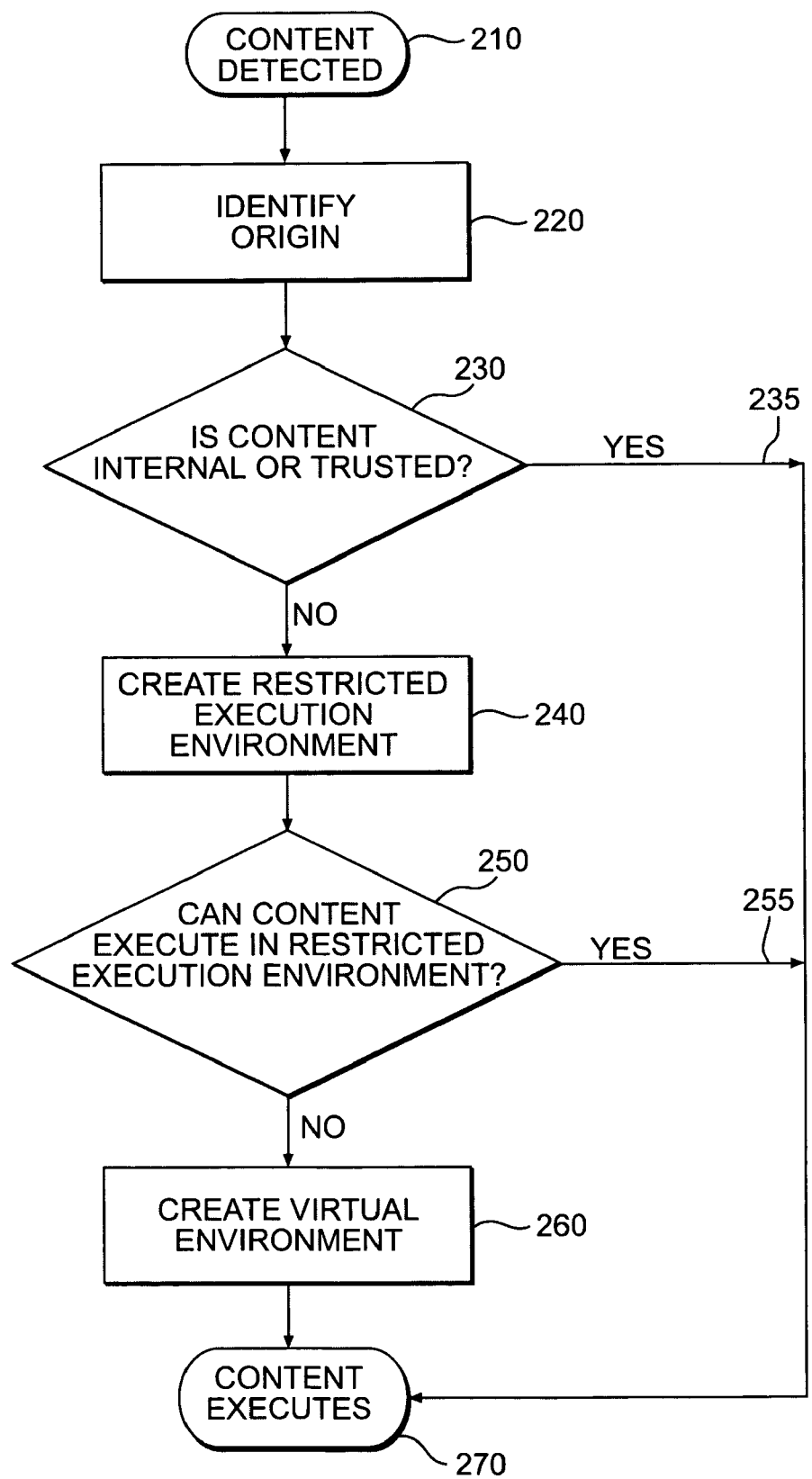
FIG. 2 is a flowchart describing the implementation of the security solution according to the preferred embodiment.

FIG. 2 explains the general process of identifying detected content, and allowing it to execute. When content is detected 210, the security client will identify the origin 220 of the content, and tag it accordingly. From the tag, the security client is able to determine whether the content is trusted 230. If the content is trusted, then it is allowed to execute 235. If it is untrusted, then the security solution will create a restricted execution environment 240 which will create an Isolated Context that will allow for the content to be executed without being able to explicitly access the local environment, or Protected Context. Without access to local resources in the restricted execution environment, not all content can successfully execute 250. If the content does not require any local resources, the content will execute in the Isolated Context 255. If the content requires local resources, a virtual environment will be created 260, which allows mediated access to local resources through virtualization methods, as described further below. When the content is able to access the virtualized resources, it is able to execute 270 on the client.

Each of the major processes utilized in the security solution, and their preferred embodiments, are discussed in detail below. While the detailed description below describes the implementation of the security solution of the present invention on a Microsoft Windows based operating system environment, the novel security solution can further be adapted to work on enterprise networks based on any operating system.

Content Origin Identification

There are several originating domains for content, that may use separate identification to classify the origin of the content in question. Those domains include email messages and attachments, Internet content and data, such as web pages, and content originating through other TCP/IP based transports, and on-disk files, and files on file servers, both internal to the enterprise network and external.

Note that for content originating in a secure context, it is possible to use signatures (e.g. PGP signatures) to sign the content using a private key known only to the secure context while it is still inside the secure context, so that even if this content passes out into an insecure context, it can be considered secure when it comes back, as long as the signature matches, because this would mean it has not been changed in any way since it originated from the secure context.

There are several methods possible for identifying the origin of email and attachments. One method is tagging external email upon arrival at external mail transfer agents (MTA). Another method is securely tagging internal email, e.g. through cryptographic signatures, upon composition, or upon entry to the initial enterprise MTA. An additional method is parsing the headers of received email to determine the routing path for the messages. If the enterprise server is an Exchange serve, a method could be testing email for other properties, such as the existence of SMTP headers. Finally, deriving the origin by examining cryptographic signatures on the message.

Given that the internal enterprise network and other trusted networks can be described as a set of IP addresses, and that it is possible to protect workstations against IP address spoofing by well-known means, it is possible to ascribe Internet content and origin based on the IP address it arrives from. Further, provided that the restricted environment is constrained each to communicate only with external IP addresses, it can be reasoned that no content it handles can be of internal origin. Similarly, if the normal execution environment is then constrained to communicating only with internal IP addresses, it can be reasoned that no content it handles can be of external origin.

This is in fact how the security client software ascribes origin to internet content: all files created in the restricted environment are ascribed an external origin, while files created in the normal environment are ascribed an internal origin.

The methods that the security solution uses to determine the origin of content works with the Tagging Mechanism (described below) to tag content depending on their origin.

Tagging Mechanism

To prevent content from flowing across the boundary between the internal and restricted environment through files on hard drives and file servers, it is preferred that the original classification persists with the content on hard drives. For our purposes it is sufficient to tag those files who are of external origin, or which must be assumed to be externally tainted, although it is perfectly possible to tag all files with their origin.

The simplest tagging method is to alter the name of files in some fashion, depending on the file's origin. From a security perspective, the only requirement on the tagging scheme is that it be possible to identify a file as internal or trusted, or external or untrusted, by the tag. From an interoperability perspective, however, there are other considerations that come into play.

One method for tagging file names is to add a new suffix to the original file name. On Windows, a file's suffix also associates the file with an application to open it, a method for retrieving the icon and preview for the file, etc.

Another way for tagging file names is to inject a particular string somewhere into the filename, apart from in the suffix.

While name tagging is simple and efficient, it may have some drawbacks. Adding a suffix or infix string to a file name causes an extension of the file's name. This can be a problem for filesystems that don't support arbitrarily long names, or names of arbitrary construction. Also, in a non-universal deployment, it is possible for external content to infect the enterprise intranet through workstations which do not make access control decisions based on the file name tagging convention.

It is also possible to tag files through the modification or addition of other file attributes, such as alternate file streams. On NTFS filesystems, a file can consist of more than one data stream. Each such data stream is named, and consists of an array of bytes, just as the default data stream of a file. It is possible to interpret the existence, or content of some particular such stream as an origin tag.

Additionally, files can be tagged by external attributes. On NTFS and FAT filesystems, files can be adorned with these so-called external attributes. An external attribute is a name-value tuple. As with alternate file streams, it is possible to interpret the existence or the value of some particular external attribute as an origin tag.

On NTFS and other security-enabled filesystems, files have an associated Security Descriptor. A Security Descriptor contains, among other things, a list of Access Control Entries, each of which assigns (or denies) a set of permissions to a principal, named by sender ID (SID). It is possible to interpret the existence of a SID in an SD as an origin tag.

One method for persisting the origin of files is by allowing files of particular origin to exist only in particular places on the filesystem or network servers. This way, the path to a file implicitly carries information about its origin.

A simple method for persisting the origin of files is to prefix (or suffix) the file content with a header (or footer) that describes its origin, or to otherwise "envelope" the file contents. The header can then also carry auxiliary information, if it is so desired, such as to the modification history of the file etc.

For many applications, prefixing a file with a header may have the effect of rendering the file useless for use on clients that do not know to provide applications a view of the file, where the header has been stripped. This can have the beneficial effect of eliminating the propagation of malware through non-protected clients in a non-universal deployment.

However, many applications do, or can be made to ignore such headers. In order to get the same benefit of rendering the content useless and therefore benign to those applications, it's possible to transform the file content through any reversible transform, such as encryption/decryption, or through a simple "exclusive or" (XOR) operator.

It is possible to change the operating system's filesystem so that it natively supports tagging. The filesystem can even be changed to natively understand the concept of the Isolated Context and limit access to tagged files to the Isolated Context unless it is mediated by some of the means discussed below.

It is also possible to represent a tag as a path prefix and use access controls that recognize the prefix, and disallows actions that cross the boundaries of the Protected Context and the Isolated Context from open dialogs, and instructs the user on how to perform the desired action. This is achieved by reserving a section of the universal naming convention (UNC) namespace for tagged files. The tagged files are an alias of the real files, and there exists a 1-1 mapping with the real UNC namespace. Then, the security solution would arrange all open/save calls to return the file names from the alias, instead of the real name space. This method also is able to discern the intent of the user, preventing the execution, or the opening or saving of files initiated by programmatic action.

Figure 3:
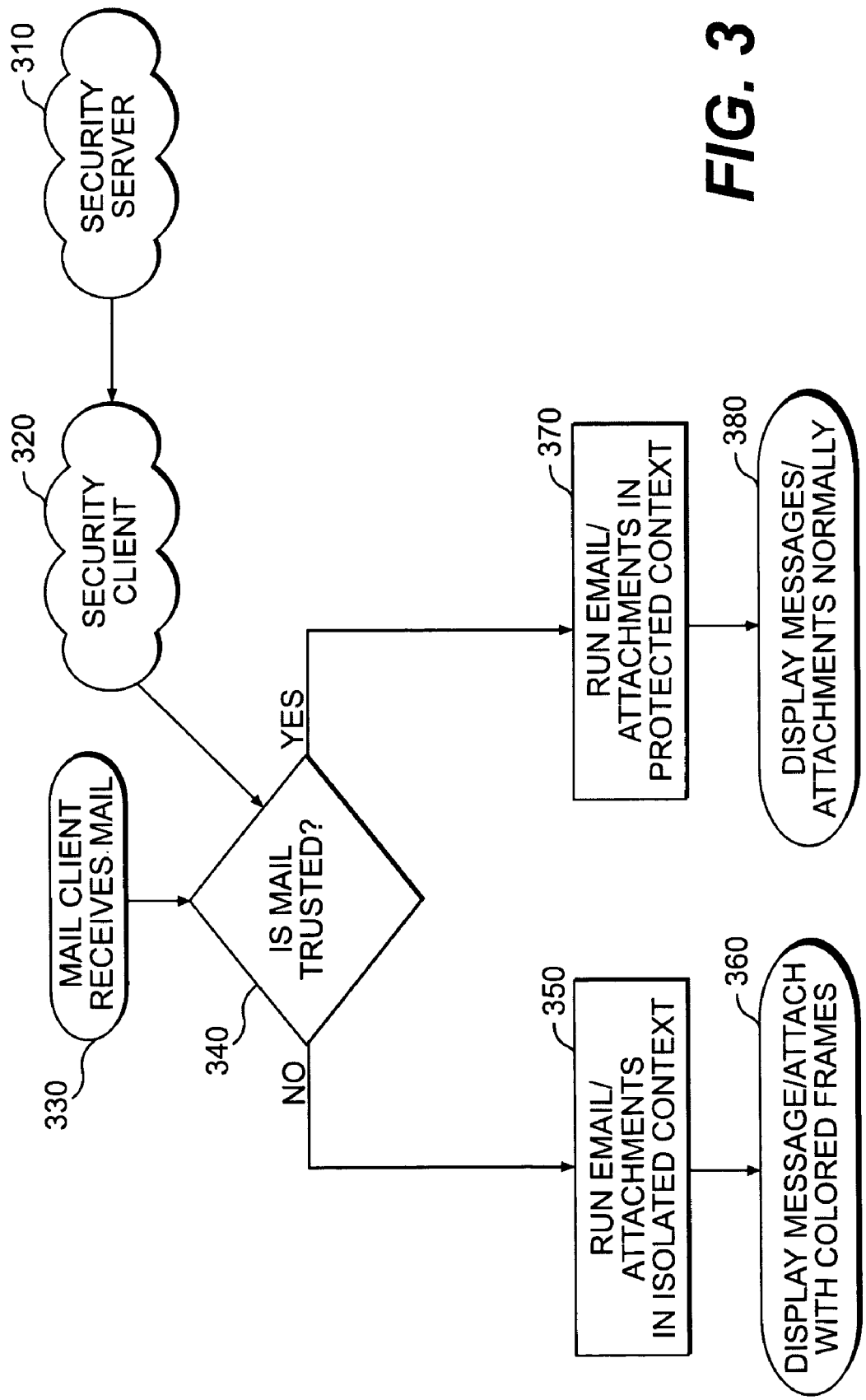
FIG. 3 is a visualization of an embodiment used to identify an incoming email message to determine whether to display the message in the Protected Context or the Isolated Context according to the security solution of the present invention.

As shown in FIG. 3, determining whether a particular mail item comes from a trusted or untrusted source, may be done by parsing the transport headers for that mail item. When an email client 330, such as, for example, Outlook is connecting to an email server such as Exchange server, then messages that are delivered only through that server (or linked Exchange servers), have empty transport headers.

The trusted/untrusted mechanism 340 fetches a script from the security solution policy mechanism obtained from the security server 310 through the security client 320 and initializes it within the Outlook process. This script can be implemented in any ActiveScript compliant script language, including JScript and VBScript. The preferable approach for the script is that a function named IsMessageTrusted that returns a boolean value that is true for all trusted messages and false for untrusted messages. This function can accept a single string argument that contains the transport headers for the mail item for which the status is being checked.

The security solution provides a default implementation of this script that parses the IP addresses of the servers from the transport headers and compares them against the current security solution policy for trusted and untrusted IP addresses. This script can be customized by the network Administrator via the security solution web UI.

For embedded mail items such as embedded images, email attachments and embedded messages, the trusted/untrusted status of the original message can be aggregated to its descendants. For example, if an email message that contains another email message as an attachment, then the attached email message will typically be considered external and the IsMessageTrusted check can only be done for the parent message. If the attached message has sub items of its own, then those items can also have the same status as the top-most ancestor mail item, in this case that may be 'external' regardless of transport headers.

By knowing the trusted/untrusted status of a mail item the security solution can provide a visual presentation (green-frames) 360 of the application running in the isolated security context, it will allow HTML to be rendered in the Isolated Context 350, and correspondingly mark mail attachments as trusted or untrusted and accordingly open the attachments in either the Protected Context or the Isolated Context. If the email message and/or attachment is trusted, then it can be safely run in the Protected Context 370, and the email message and/or attachment will be displayed normally 380.

This can also be accomplished by implementing the trusted/untrusted check on Exchange or other mail server as an extension to the server or as a native change to the server. Then implementing a proprietary mail gateway for accepting mail. Make changes to Outlook (or any email client) so that it natively understands the distinction between trusted and untrusted email. This provides the security solution management server interception framework for intercepting MAPI and Outlook, to implement a lookup of the policy associated with the email, and allows the viewing of untrusted HTML content in Outlook, or any other mail client.

The client and the management server are integral components of the security solution setup. The client may rely on the management server for the client policies, which man identify the rules using which the client makes critical security decisions. The policy contains information like network rules which may identify internal (Secure) and external (Insecure) networks.

It is clear from the above that the policies coming in from the management server are directly proportional to level of security provided by the client. This may not be a big issue in enterprise networks which are tightly controlled and are protected by firewalls. For mobile users, however, this is a big security issue. The mobile user is always on the move and using accessing the enterprise network through such mediums as cyber cafes, insecure wireless networks, etc to create a virtual private network (VPN) into the enterprise network. If the client attempts to download policies from the management server, which can be easily spoofed in insecure networks like the above, incorrect policies could be downloaded from a malicious server, which could compromise the client machine and in turn infect the enterprise network through the VPN. As mentioned above the level of security provided on the client may be completely dependent on the policies coming in from the server. To protect the mobile user from attacks like the above, the client implements a component which attempts to authenticate the management server.

When the client comes up it may first try to authenticate the server. The authentication process is similar to the NT Lan Manager (NTLM) challenge response protocol, with the client throwing up a challenge and the server responding to the challenge with a response which is then validated on the client.

If the authentication succeeds, the client may look at the best network interface to get to the server, and can mark that interface as authenticated. All other network interfaces may be considered unauthenticated. The authentication component may then take a snapshot of the network and persists this information. The snapshot can include the gateway information, VPN server information, etc. The component may then notify the other client components that authentication succeeded. This can then trigger attempts to download the policy from the server, etc.

If the authentication fails, the authentication component may compare the current network snapshot, with a snapshot of the network when the client previously authenticated successfully. If the snapshots match, the client may enter a state called as tentatively authenticated. In this state the cached policies on the client may be pushed down to the kernel. The may client also add deny rules for the internal network, using information from the cached network rules for this purpose. In the tentatively authenticated state the Protected Context may be denied access to the network, and Isolated Context may be denied access to the internal network.

If the snapshots don't match, the may client enter an unauthenticated state where in the entire network is deemed external. Protected Context can be denied access to the network. Isolated Context may have full access to the network.

The authentication component solves the mobile user problem mentioned above by preventing Protected Context from reaching out and accessing malicious hosts on an insecure network, when in an unauthenticated or tentatively authenticated state.

The authentication process may also prevent incorrect policies being downloaded from a spoofed server on an insecure network. The assumption here is that the authentication process is virtually foolproof.

This can also be accomplished by using secure hypertext transport (HTTPS) to authenticate the server instead of maintaining a homegrown authentication mechanism, and by changing centralized network components such as the Windows Domain Controller so that they natively support network authentication, as part of the logon process.

The security solution also seeks to apply network rules to determine whether a network is trusted or untrusted. The idea is that we should apply network rules on machines that are generally fixed in place and always connected to the enterprise network. If these machines have multiple network interfaces, we should protect them all (since they're all connected to the enterprise network).

For mobile computers, unauthenticated interfaces are presumed to be connected to a foreign network. Because the foreign network could reuse address that are labeled as trusted, we do not apply network rules but instead just treat all traffic as untrusted. When an interface becomes connected to an authenticated server, such as by establishing a VPN connection, we apply network rules to that interface.

However, there is a problem when the network rules trust "foreign" addresses. A "Mobile" configuration should be the default setting for all configurations. A "Desktop" configuration is only the rare case when a fixed computer has multiple network interfaces connected to the enterprise network. The security solution should have a rarely-used, special case switch for these machines, and let the default case (apply rules only to authenticated interfaces) apply to most machines.

However, this still doesn't solve all of the problems. The goal is to have the "internal" trusted IPs to be only accessible over authenticated interfaces and the other trusted IPs to be accessible from any interface. Therefore, it is desirable to have the current desktop semantics for all rules except for the networks you identify as "internal, require a direct connection or VPN". The solution is to first have a toggle in the per-machine configuration in the management server for "Multi-homed desktop." Then, add a flag to all network rules: "Trust only on interfaces that authenticate a server." (This can just be ignored if the rule is not "Trusted"). Thus, the "authentication required" flag is off by default for new rules, but the network administrator could be warned when a rule is created for a non-routable network and this flag is not set. Then, ff the "multi-homed desktop" flag is set, ignore the "authentication required" flag. Otherwise, for authenticated interfaces, apply the rules as stated, for unauthenticated interfaces, flip the "authentication required" rules from trusted to untrusted, and for tentatively authenticated interfaces, flip the "authentication required" rules from trusted to always deny.

Figure 4:
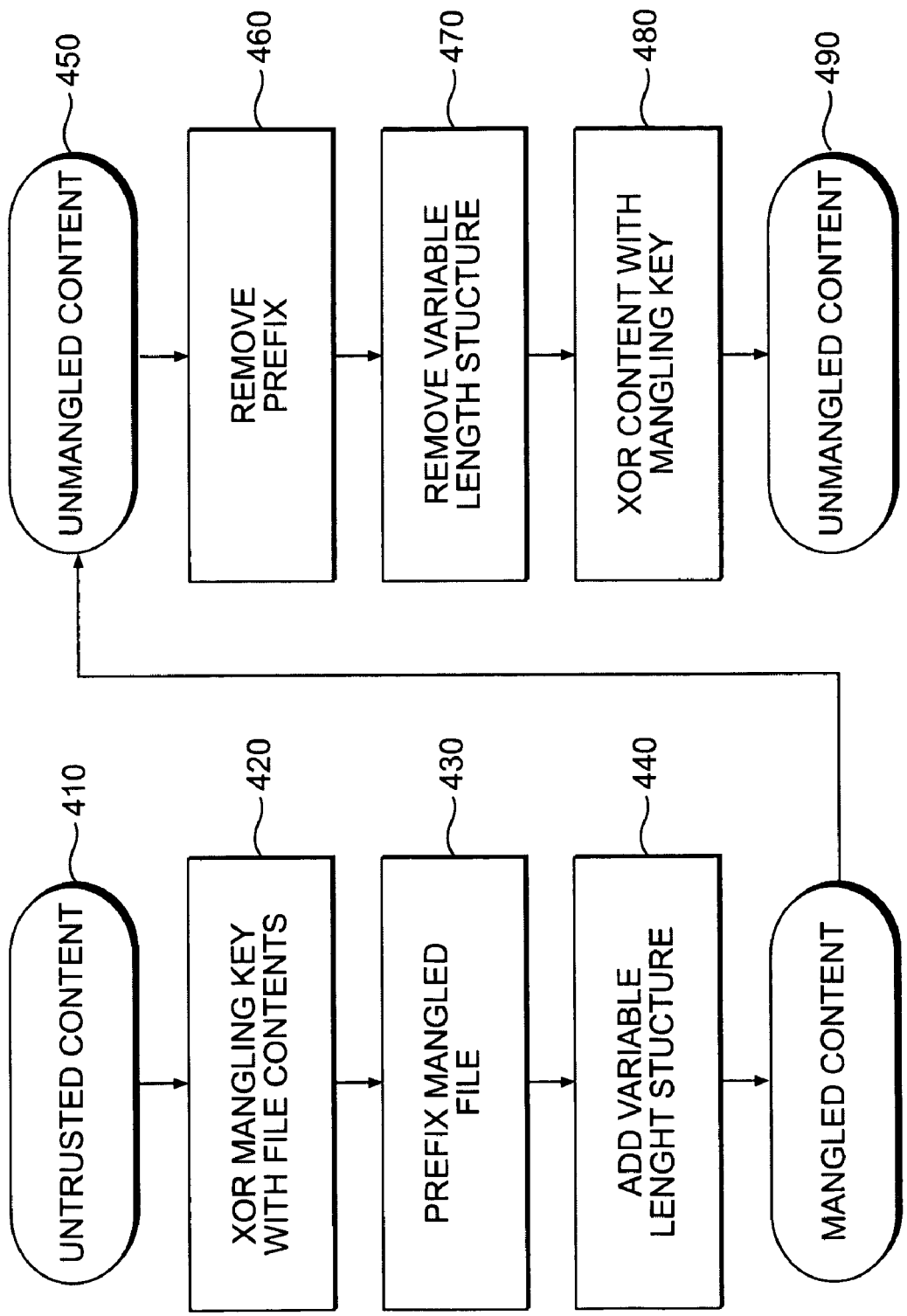
FIG. 4 is a flowchart showing an embodiment of a tagging mechanism implemented in the security solution of the present invention.

FIG. 4 shows how an approach using an unique identifier (mangling) key can be used to prevent files from being readable without the mediation of the security client. Mangling a file restricts and obfuscates its usable content, and unmangling reveals the usable content of a file. When untrusted content is detected 410, include a mangling key (to be used for XORing content with) in the security client software. To mangle a file, XOR the mangling key 420 with the contents of the file. Mangling can also be accomplished by using other algorithms, including: 3DES, AES, RSA, x509, etc. After mangling, prefix the mangled file with a block of ASCII text 430 (which is readable by most application programs) that gives the user instructions on how to open the file (e.g. tells the user they must open this file by enabling the security client and double-clicking on it in Windows Explorer). Instead of ASCII test, eXtendable markup language (XML) can also be used. Finally, add a variable-length structure 440 (e.g. holding name-value pairs) before the mangled part of the file, including in this structure such information as the mangling version. To unmangle a file 450, remove the block of ASCII text 460 and the variable length structure 470, then XOR what you have left with the key 480 to get the original contents 490.

This mangling process ensures that the file may is unusable without the mediation of the security client, thus protecting systems that are not running the security client from inadvertently running external or untrusted content.

A tagging mechanism incorporating mangling can also be implemented in other ways. The mangling key could be set per installation of the management server, as a configuration parameter. This would prevent, for example, mangled files from enterprise A's installation of the security solution from being usable on enterprise's B installation of the security solution, thus preventing a user with a security solution installation from enterprise B from inadvertently running external or untrusted content mangled on the computer of a user from enterprise A. Instead of simple XORing, any reversible encryption could be used, using the same key, which could be per enterprise as above.

A public/private key infrastructure could be maintained by the security solution, in which each computer with a security client installation would have its own public/private key pair, certified by a master key on the management server, which might be certified by a master key issued by GreenBorder or by a CA (e.g. VeriSign). All workstations' public keys would be available on the server, to any workstation that could prove its identity to the server by signing a challenge using its private key. Mangling could be done by encrypting a file with the private key of the workstation that first got the content from the external source (be it email, web site, etc.) or created the content, and prefixing the data block with a header indicating which public key to use to decrypt the file.

Support could be built directly into the filesystem for mangling and unmangling files, or for storing tagged files without mangling, but including the informational header etc.

Figure 5:
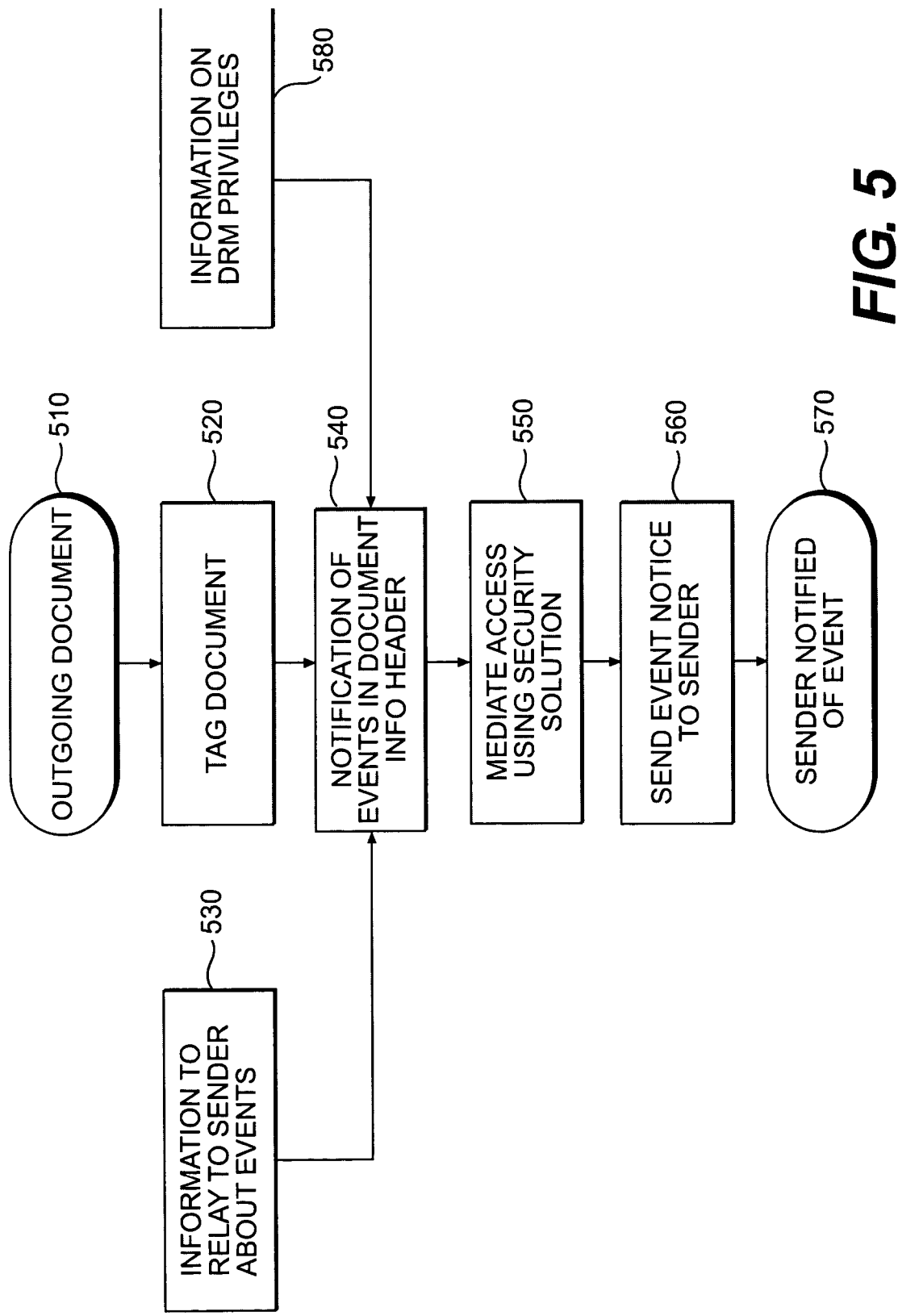
FIG. 5 is flowchart showing an embodiment of a method that can be used in the security solution of the present invention to tag outgoing documents.

The tagging mechanism could also be used to track a document, as is shown in FIG. 5. All outgoing documents 510 could be tagged 520 in a way that prevents access to the document except when mediated by the security solution. This could be done with the mangling feature as described above. In the informational header included in the tagged document 540, include the information 530 needed to send notification of events back to the original author of the document, e.g. include the author. As tagging prevents the document from being used except from within a restricted execution environment, we can be sure the security solution is mediating all access 550. Whenever "important" events occur, send a notification 560 back to the original author, e.g. via email 570. Important events may include reception of document, opening of document, printing of document, forwarding of document, saving of document to network drive or shared drive, modification of document (in this case, original author might be sent the modified version).

Document tracking is typically more useful when it is secure. One way to make it secure is to use a public/private key infrastructure, as discussed above, to make mangling and unmangling secure and to be able to know for certain whether the user unmangling the file is the original author or not.

Another feature of the tagging mechanism allows for tagging for digital rights management. When a document is sent outside an enterprise, it may be desirable to be able to send it to a single or multiple recipients and restrict the recipients' rights to perform certain actions on it 580, such as forward it or print it. This can be accomplished using the same mechanism that is used to track documents, as discussed above.

It is possible to employ transparent isolation to maintain the origin of document contents. To do this, each distinct document origin or set of document origins is provided a separate execution environment, tagged to the origin or origins it serves.

Upon the creation of new documents, a new execution environment may be created, tagged to an empty initial set of origins. Each time any content is copied from one document to another whether through copy/paste, drag and drop, or through explicit file insertion, the content origin or origins can be propagated from the source to the target. When the resulting document is saved, the set of origins can be persisted in the resulting file's tag.

Restricted Execution Environment

In order to allow the use of external, potentially malicious content without inviting disaster, it's preferable to restrict the services available to such content and the applications executing it. The resources that can be protected include files on the local filesystem, files on network servers, exposed through filesystem redirectors, the local registry, and other kernel entities that maintain state which can be shared, Such kernel entities include named kernel objects, e.g. semaphores, events, devices, pipes, etc., shared file and image sections, inter-process communications (IPC) ports, and other communications mechanisms, such as windows/window events. It is to be noted that protecting all such kernel-exposed resources and communications mechanisms may also result in protecting all user-mode services, since communication between processes can be done through such mechanisms. Additional resources that can be protected are services on the enterprise intranet, exposed directly to user-mode processes through networking protocols such as TCP/IP. This includes such things as intranet web sites, file servers and other sharing repositories, printers etc.

Additionally, in order to protect against denial of service attacks by the restricted environment to the local workstation, intranet network infrastructure and services, it's preferable to limit the amount of shared resources that the restricted environment is allowed to consume, and/or the level of service the restricted environment can request from the operating system or the network environment. The amount of shared resources that the restricted environment is allowed to consume can be limited by placing limits on the amount of physical memory and page file consumption, on the restricted environment's CPU consumption, on the frequency or scope of network operations, and on the amount of network bandwidth consumed.

These resources can be protected by using such methods as kernel-mode application program interface (API) interception with the imposition of stricter security or by diverting requests for named resources to alternate sets of named resources. Another protection method is to use a user-mode API interception, although this cannot be considered secure. Resources can additionally be protected by using interposition and filtering in layered operating system (OS) services, such as filesystems and device stacks.

The restriction of network resources through the creation or use of alternate or derived user accounts and credentials can be perpetrated through the following means: restricting access to the user's credentials when authenticating from restricted environment; restricting access to server resources through modification of authentication protocols, with cooperation on server hosts; restricting access to server resources through the creation of synthesis of domain-wide user accounts derived from real user accounts.

In general, to create a restricted execution environment, it is possible to leverage the OS services in Windows to create a restricted execution environment. The idea is to construct a security token which allows almost no permissions to any existing, secured objects. Whenever there is a need for allowing the restricted environment access to resources it is unable to access under normal access checks, this can be done through impersonation, through interposition and proxying or through redirection to copies of such resources, which have more permissive security descriptors than the original resources.

The security token mentioned above can be constructed in different ways, depending on the level of restriction required, and other desired properties of the environment. For example, the token can be created by taking a token created through a real user login, and adding restricting SIDs to it through such calls as CreateRestrictedToken, NtFilterToken or SeFilterToken. Depending on the set of restricting SIDs, the permissions granted to the resulting token can be limited arbitrarily. By creating a new token which refers a minimal set of SIDs, which are potentially newly created for the session, and thus guaranteed not to match any existing access control lists (ACLs).

In order to allow for efficient recognition of restricted security contexts by kernel or user-mode components, it's possible to tag them with a SID or SIDs, which exist only for the identification of such restricted security contexts. Those SIDs can be marked as for deny only, and/or disabled in the security token, since they should ideally never broaden the permissions a security token implies.

There are many system components and services which use information from a requesting client's security token to make all kinds of security decisions, which may optionally be cached and later retrieved using the security tokens Authentication ID. Notable cases of such components are the Common Internet Filesystem (CIFS) client, and the Component Object Model (COM) activation mechanism, including the Class Object Table (COT) and the Running Object Table (ROT), hosted in RPCSS. This affects the decision on how to construct the token, since if it is for example desired that the restricted environment refer its own instance of the COT and the ROT, one way of doing so is to construct a token with an alternate owner SID.

Having created such a restricted execution environment, which is extremely limited in the resources it can access, and thus in the actions it can perform, the next problem is to figure out how to broaden its reach, so as to allow it to perform useful work.

Generally, interposition is preferred in order to allow the inspection of the resource access the application is requesting, and diversion of the access to some privileged mechanism that can perform the access on the applications behalf. Interposition methods can include intercepting the Windows kernel-mode system calls, through modification of the system call table, or by patching the actual system call functions. Another interposition method is intercepting the user mode invocation of the kernel-mode APIs, e.g. the ntdll.dll entry points, and diverting the system calls through another mechanism, which may invoke a higher-privilege service, able to interpret and potentially grant the access, such as an interprocess communication (IPC) mechanism to another, higher privilege process, or through a DeviceIoControl call to a kernel-mode device. Interposition can further be accomplished by intercepting the user mode invocations as above, but explicitly redirecting requests to an alternate set of named resource copies. This may serve both to access alternate copies of resources, and to allow high-performance collaboration between the user-mode interception mechanism, and kernel-mode components, which is can be responsible for the portion of the namespace referred. Additionally, a redirection of requests to well-known communications ports, to alternate services, or proxies can be used for interposition.

It is to be noted that when an interposing, higher privilege service grants access to a requested resource, that it may not be necessary for such a service to run at the unrestricted environments full privileges, but that such a service could well employ another restricted token, which has e.g. the Administrators group and any unneeded privileges removed.

Using token mutation to create a restricted execution environment provides a simple and easy to use method, which gives a consistent, high level of security with minimal implementation cost. Restricted tokens can be created, which are primary or impersonation access tokens that have been modified. They are restricted by removing privileges from the token, and not being allowed to access secured objects. The system uses a list of restricting SIDs when it checks a token's access to a securable object. When a restricted process or thread tries to access a securable object, the system can perform two checks: one using the restricted token's enabled SIDs and another using the list of restricted SIDs. Access is only granted if both access checks allow the requested access rights.

By using a newly created SID, or a SID created for the specific purpose of maintaining a persistent restricted execution environment, it is possible to simultaneously employ the underlying operating system services to enforce security, and to provide a split view of system services, such as COM activation and the like. This further involves mediating access control using SID injection. This involves tagging the Isolated Context by injecting one or more security solution specific SID's into process tokens of the user's Isolated Context applications. This enables the recognition of all applications running in the Isolated Context, and allows enforcement of the restricted execution environment. This process also involves modifying the security descriptors in process tokens of the user's applications in the Protected Context in order to deny the intrusion of the injected SID's of the Isolated Context, thus ensuring that applications running in the Isolated Context do not have access to objects in the Protected Context.

Leveraging security tokens in the creation of a restricted execution environment may also have the side benefit of allowing recognition of when system services or other servers are executing on behalf of the restricted environment through impersonation.

Further methods can be used to create restricted execution environments. One further method is to restrict by API interception, therein intercepting kernel mode services and consistently imposing a new, more restrictive security model than provided by the underlying system, and/or consistent redirection and copying. Restriction can also be obtained by other OS-provided mechanisms such as the Job mechanism which can protect windows, the clipboard, atom table etc. Restriction can also be realized by full-host virtualization using such features as VMWare. This approach provides excellent isolation between the restricted and unrestricted environments, but makes it difficult to provide a UI consolidation, plus there are license issues to be considered due to the fact that there is for example a full OS installation on the virtualized host. The native Windows security model can also be modified to include the concepts of the Protected Context vs. Isolated Context, thereby enabling the creation of a restricted execution environment.

Figure 6:
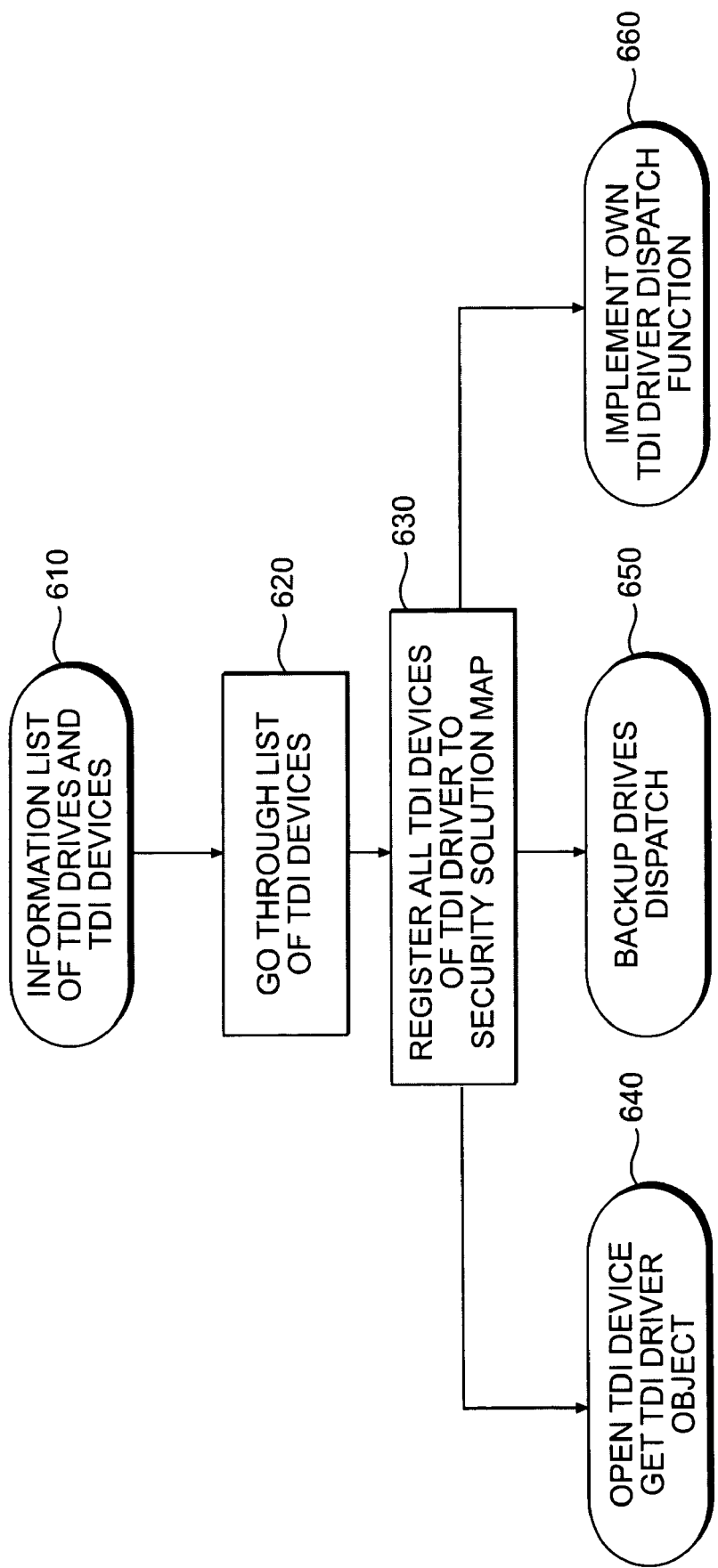
FIG. 6 is a flowchart showing a method that can be used to create a restricted execution environment according to the security solution of the present invention.

Creating a restricted execution environment can further be achieved using transport driver interface (TDI) interception, which can basically hook the TDI driver object to monitor all the I/O requests coming to the TDI devices. As shown in FIG. 6, from a list of TDI drivers and TDI devices 610, this can be accomplished by first going through the list of TDI driver information 620 and registering all the TDI devices of a TDI driver into the security solution TDI device to a security solution device map 630. Then, open the TDI device and get the TDI driver object 640. The security solution then may backup the driver dispatch table from the driver object 650. Finally, the security solution may implement its own TDI driver dispatch function 660 which can become the entry point for all the I/O requests coming to the TDI devices of that TDI driver.

The TDI intercepts ensures that the Isolated Context may only have access to external content, and the Protected Context may only have access to internal content, thus avoiding any leaking of untrusted content into the Protected Context or trusted content into the Isolated Context.

This further enables the monitoring of all the network traffic going through the TCP/IP devices (TCP/UDP/IP/IP-MULTICAST and RAWIP) and allowing the access control of it. It also enables the security solution to intercept various TDI drivers uniformly which deals with different network protocols.

The Isolated Context's access to network resources can be controlled may by creating a separate user account for the Isolated Context on the Windows domain that the user's computer may be part of, and to use that user account to give the Isolated Context limited access to certain files and folders on fileservers via DACLs on those files and folders. All access to files by the Isolated Context would be done using this user account. The Isolated Context user account may not be a member of any group except the Isolated Context users' group, thus preventing the Isolated Context from gaining access to anything not tagged in the DACL with the Isolated Context user group. The Isolated Context user account could have a name derived from the real user's account, and a randomly-generated, changed-at-every-logon-of-the-real-user password.

One way to create the separate the Isolated Context user account, is to impersonate as the domain administrator for a short time during the installation process for the security client, and during that time to communicate with the domain controller using Windows APIs to create the user account, set its password, ensure it is not a member of any groups. To get domain administrator credentials, one way is to request them during the install process, similar to what is done when new machines are entered onto a domain. This allows us to restrict the Isolated Context's access to resources on the network, for example, files on a fileserver, with similar semantics as for local resources, without requiring software on any server computer or a change of configuration on the Windows domain controller.

The above could also be done could by hooking into the Active Directory as an LDAP provider, and through that to "synthesize" accounts for the Isolated Context. In other words, it could be possible to authenticate as the Isolated Context user account, but the domain administrator may not see all of the different Isolated Context users in the list of users, thus simplifying administration. This method prefers at least configuration changes on the domain controller, and possibly software from security solution provider to be installed on the domain controller.

It could further be possible to change the Windows domain controller or Windows Active Directory implementations to natively support the synthesis or on-demand creation of the Isolated Context user identity.

Creating a restricted execution environment according to the present invention also requires placing software on file servers to enable similar access for the Isolated Context as on local filesystems. This may involve installing special-purpose security solution software, a security enabler, on each fileserver that can be intended to store files some of which should be accessible to the Isolated Context. To avoid the Isolated Context ever having the Protected Context's credentials, the Isolated Context may be only given access to credentials that have the same username as the Protected Context user, but a random password that is generated every time the Isolated Context requests it. To enable the system administrator to indicate which files on a fileserver should be accessible to the Isolated Context, a special group named e.g. the Isolated Context Users is created on the Windows domain at the time of installation of the security management server.

Figure 7:
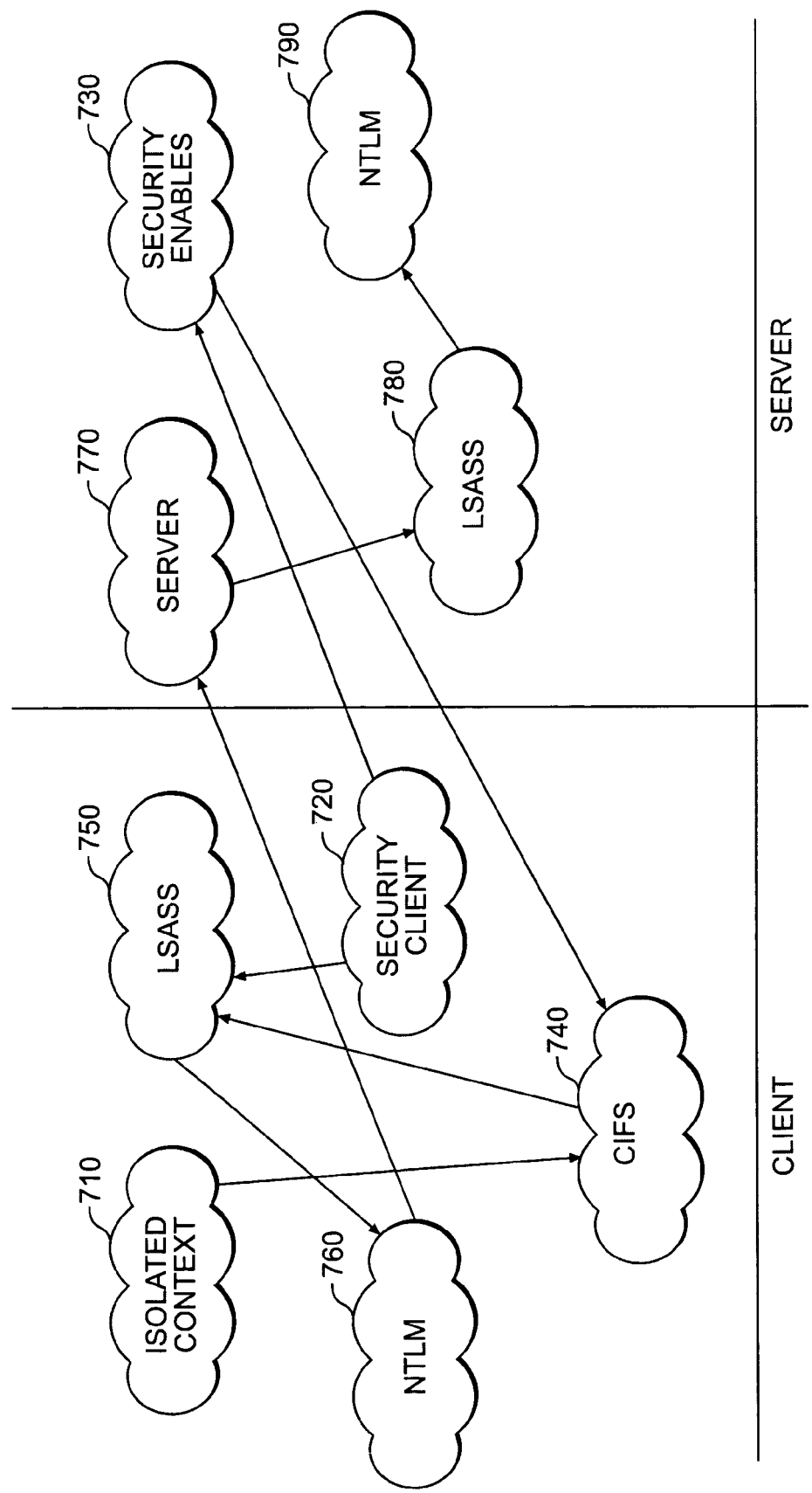
FIG. 7 is a conceptualization of a method for restricting access to local resources using a security enabler according to the security solution of the present invention.

FIG. 7 demonstrates an embodiment of this solution. The Isolated Context can attempt to open or create a file that may be sitting on the network. It may use CIFS to do this 710. The security client can intercept the relevant functions 720 in CIFS to catch all such events. It may check whether the Isolated Context or the Protected Context is requesting the action, and if it is the Isolated Context, continues as described below. During the intercept to the CIFS function, the security client may take the universal naming convention (UNC) pathname that the Isolated Context passed to CIFS, and uses it to create a UNC path to a named pipe on the same server (i.e. it strips everything but the server name and adds the name of the pipe on that server). It may then open up this pipe, and send a registration message to security enabler 730, which may be the receiving end of this pipe. The registration message contains a shared secret which has been randomly generated. The message may be encrypted using a session key. Control may now be passed back to CIFS 740. It can ask the local security authority subsystem service (LSASS) 750 to authenticate this machine to the receiving end of the pipe, and LSASS may in turn ask NTLM 760 to perform the authentication. The way we make LSASS preferably choose NTLM (instead of e.g. Kerberos) is to ensure there are no Kerberos credentials in the Isolated Context's execution context. An authentication request can now be sent to the server 770, with the user ID of the Isolated Context user (this is the same as the user ID of the Protected Context user). This authentication request may go through to NTLM on the server as usual, without intervention from the security enabler. It will respond to the client with a challenge, including a nonce. At the point where LSASS passes the challenge to NTLM, the security client may intervene by patching the InitializeSecurityContext function which is part of the SSPI API implemented by NTLM). Instead of allowing NTLM to build the outgoing token, the security client may create a response that is a hash of the shared secret exchanged with the security enabler earlier concatenated with the nonce the server sent, i.e. H(sharedSecret nonce). On the server side, the response can make its way through SRV to LSASS 780, which will call the AcceptSecurityContext on the NTLM SSP 790. The security enabler patches this function, and instead of allowing the NTLM SSP to respond to it, it may do the following: Via the named pipe previously opened (it is still open), it may send a request back to the security client to initiate an authentication request over the named pipe. This may cause the security client to use the standard means to authenticate itself to the endpoint, which can automatically use the best available authentication mechanism (e.g. Kerberos rather than NTLM). Once the security client's authentication request over the named pipe completes, the intercept of AcceptSecurityContext may have a token on its thread, which may be the token of the Protected Context user as reported by the domain controller. The security enabler now mutates this token in the same way as is done on the client side in order to create a severely restricted token for the Isolated Context "user" that is also a member of the Isolated Context user's group. The security enabler's patch on AcceptSecurityContext can now return OK to LSASS, and we have achieved the goal of placing the Isolated Context "user" token (a severely restricted token derived from the Protected Context token) on the thread that may perform actions on The Isolated Context's behalf, and of having used the best authentication protocol available to do the actual authentication, which is that of the Protected Context user.

One different way to achieve the above that has already been mentioned is to create or synthesize the Isolated Context "user" account on the domain controller, and simply authenticate as that user account.

Another way to achieve the above would be to give The Isolated Context credentials on the client where the Isolated Context user ID may be the Protected Context user ID with a suffix appended, and the password may be randomly generated for each session. When the Isolated Context may attempt to connect to a fileserver using CIFS, mediate the Isolated Context's access to the real credentials in the kernel, by inserting the real password into the protocol that is doing the authentication. On the server side, simply detect that the user ID has the suffix tag appended to it, remove this tag before authentication, and then mutate the token because we know it is an Isolated Context user that is connecting. This approach can be susceptible to a man-in-the-middle attack by the Isolated Context, in which the Isolated Context may perform a protocol exchange with itself.

Figure 8:
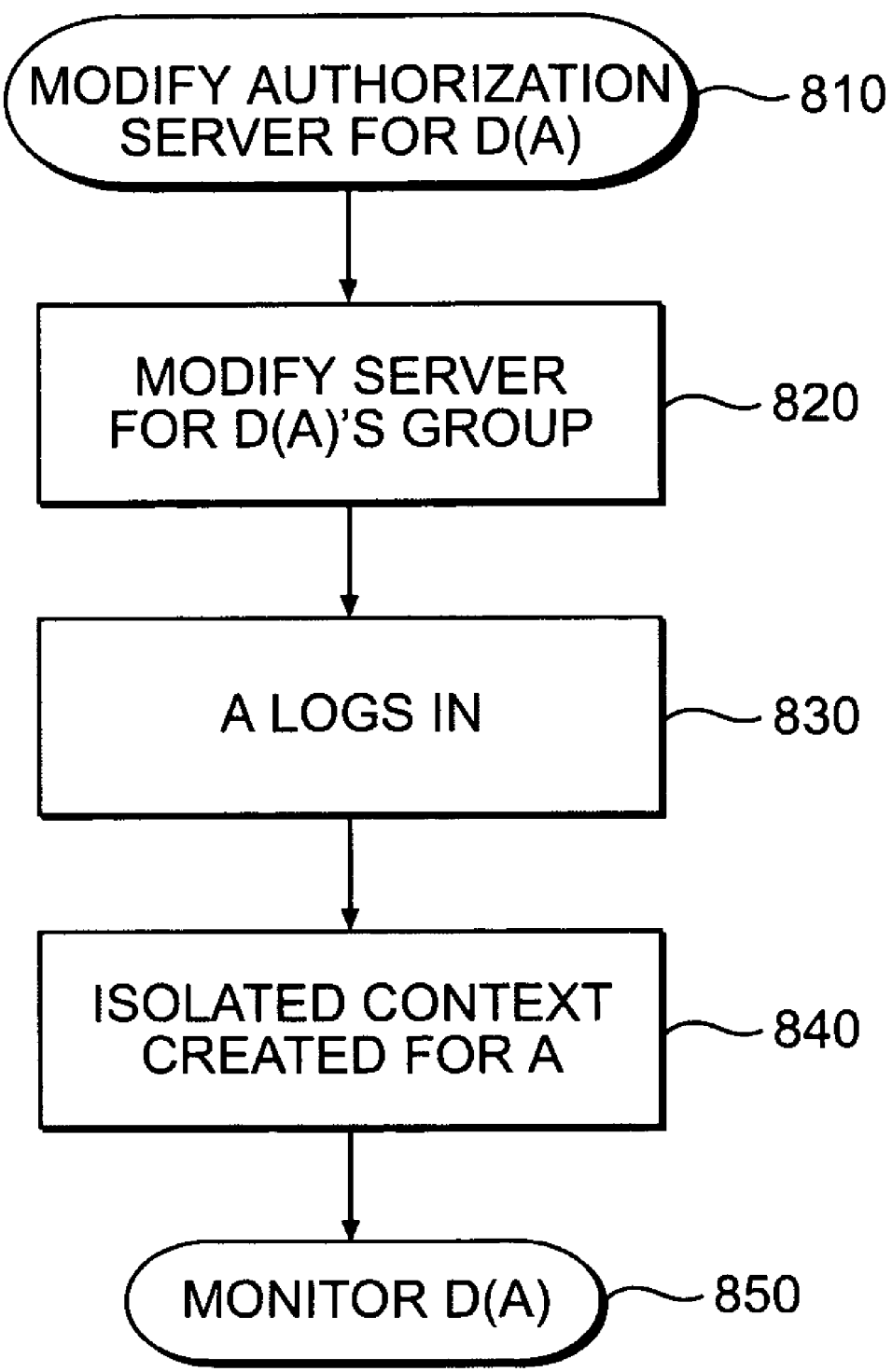
FIG. 8 is a flowchart showing a method that will allow a user to access their Isolated Context credentials from any client according to the security solution of the present invention.

For any system that uses a centralized authentication mechanism with a shared secret authentication scheme, the following approach can be used to create the Isolated Context identities that exist anywhere the authentication mechanism is used. FIG. 8 illustrates this process. First, modify the centralized authentication server 810 so as to accept authentication for any user D(A) where A may be a user that can be authenticated by the server and D(A) may be a derived set of credentials, f(userId), H(passwd) where f(userId) may be a reversible function of A's user ID and H(passwd) may be a one-way function of A's password or password equivalent credentials. Second, modify the centralized authentication server 820 so that D(A)'s group membership is functionally derived from A's group membership. Optionally D(A) can be a member of a fixed set of groups in addition to those derived from A's group membership, Then, on any workstation, when A logs in 830, his Isolated Context environment can be created by also logging in D(A) and passing its credentials to the Isolated Context 840. Next, modify centralized administration tools to allow administrators to separately administer D(A)'s access to resources 850, through D(A) directly and/or through any the derived groups it is a member of.

This centralized authentication mechanism can also be accomplished by other means. For instance, it is possible to allow changing D(A)'s group membership separately from A's group membership. Further, it is possible to change workstations and servers where A logs in to dynamically add D(A) to certain groups. It is also possible to either synthesize D(A) on the domain controller, or actually create D(A) on the domain controller on-demand, e.g. the first time A logs in.

Virtualization of Resources

The severely restricted, secure execution environment described above is in general not able to support usefully executing unmodified applications and content, because applications and content expect to be able to access, manipulate and modify certain resources. In order to allow unmodified applications and content to run inside the restricted environment, it is preferable to provide them a virtualized view of the environment, where applications and content are able to access, manipulate and modify such resources, files and that they need for successful execution.

As will be discussed in detail below, it is possible to create such a virtual environment, without allowing the restricted environment access to actual system resources, by the means of virtualization, through such techniques as interposition, redirection, copying, proxying and selective privilege elevation. For such resources which have context-free standalone state, such as files, registry keys, shared sections, named kernel objects, it is possible to redirect the restricted environment to copies of the resources requested.

The copies provided to the restricted environment can be created ahead of time, upon first request, or they can be created upon the first write to a shared object through disk copy optimization methods.

The goal of the Bifurcated Cache Map (BCM) filter may be to present 2 separate views of a given file depending on the type of process which can be accessing the file. The first view of the file may be called the mangled view, and may be identical to the on-disk image of the file. The second view may be the unmangled view, and may be a view presented after the on-disk data has been interpreted by the Filesystem Filter Driver (FSD). The unmangled view may be the plaintext view of the file contents, and the mangled view may be the obfuscated view of the file-contents. Files which support these double views are called Restricted files.

The BCM Filter may perform its task by intercepting the interfaces between IoManager, VM Manager, Cache Manager, and the FSD; and by modifying some fields of the File Object which may be the in-memory representation of an open instance of the file in NT (there can be several open instances of a given file, each represented by its own File Object). It is important to note that the BCM may not handle directories, it can only perform work for Restricted Files For Mangled accesses to a Restricted file, the BCM currently performs no-ops for all the IRPs sent from the IoManager to the FSD (the Underlying Filesystem Driver, e.g. NTFS)

For the Unmangled view the BCM filter may perform the following operations:

In Create processing the BCM may depend on the kernel mode user-intent policy code to detect that an unmangled access is happening to a Restricted File. At Create completion time, BCM may modify the SectionObjectPointers, and FsContext fields of the file-object to point to its own data. This file-object can now owned by the BCM, and may never be passed into the FSD unless its for a cleanup or close operation. This file object may be referred to as $FO_x$. BCM also opens a second stream file-object (SFO) pointing to the same path as the original Create call, and it uses this second file object to proxy I/O and other file-system operations on behalf of $FO_x$. The lifetime of the SFO may be tied to the lifetime of the FOx. The replacement of the SectionObjectPointers, and FsContext in the file object allows the BCM to present the unmangled view to the Virtual Memory and Cache Managers, this may be crucial since the unmangled view may differ both in size and content from the on-disk image of the file (which is the mangled view of the file). The Restricted File's header information may also be read at this time to determine the mangling algorithm type for this file.

For In Read/write process, the cached I/O paths, if caching hasn't been initialized for the $FO_x$, then BCM initializes caching for it, and all subsequent cached I/O requests may be satisfied from the $FO_x$'s own cache-map which preferably contains the unmangled view of the data. Cached writes are forwarded to the FSD to propagate size changes to the mangled view. For the non-cached I/O paths, the I/O may be proxied to the SFO, and satisfied from the FSD directly, and may be mangled on the say down (for writes), and unmangled on the way up (for reads).

For Query Information calls may be also proxied to the SFO, and upon completion the size information is translated to reflect the unmangled size (which is smaller then the mangled size).

For Set Information calls may perform the opposite action of the Query Info calls. Here, the sizes can be changed to reflect the mangled sizes, before being sent to the FSD. For Cleanup processing, the pointers of the $FO_x$ may be switched to the values that the FSD originally initialized them to, and then the $FO_x$ may be sent into the FSD to get cleaned up.

For Close processing the same steps may be taken.

For the rest of the FastIO and IRPs, a generic proxying from $FO_x$ to SFO may be performed before the request is forwarded to the FSD.

6 Acquire/Release FastIO entry points may be patched directly in the FSD's driver object, since filter drivers may not be called by the IoManager for these entry points. In these Acquire and Release calls standard proxying from $FO_x$ to SFO can be performed.

The above allows the BCM to provide two simultaneous views of a given file, which allows the Isolated Context to look at potentially malicious unmangled data while the Protected Context sees the non-malicious obfuscated mangled data. This could further be accomplished using a pseudo filesystem, where the $FO_x$ file-object is not sent down into the FSD, but is completed by the BCM filter.

Another object of virtualization of resource is to present the Isolated Context with a view of the file-system (FS), such that any changes made by the Isolated Context are preferably only visible to it, and preferably not to the Protected Context.

One method is to use filesystem Copy on First Use (COFU). To support FS COFU the Native API entry points of the NT Kernel are intercepted and specific work can be done for the FS related calls. The work generally falls into handling Create or Rename, where rename is considered a special form of Create.

When a file path is accessed by an The Isolated Context process, the COFU FS may be appropriately prepared to handle this file path, and then the file access may be redirected to the COFU FS. The COFU FS may exist as a sub-tree of the real FS, and can be slowly populated with items copied over from the real FS. These items (that may be copied over from the Real FS) are typically at the granularity of files and directories. The path to the COFU FS may be the COFU_FS_PATH.

The COFU FS preparation algorithm, for a given path P (where P is accessed by an The Isolated Context process), may first perform the following check: has COFU FS already been prepared for P? If not, then the algorithm may take the following action: if P consists of tokens "\a\b\c", (where each token is separated by '\'), then starting at the root token (i.e. '\a'), COFU FS may be prepared for path P' (where P'='\a'). If P' doesn't exist in the real FS, then the algorithm stops, and may consider COFU FS prepared for P. If P' is a directory, then a directory may be created at the location COFU_FS_PATH\P'. This may also involve creating all the directory entries that P' contains at COFU_FS_PATH\P'. This may be important because Microsoft 8.3 short-names must be maintained while copying items from the real FS into the COFU FS. While copying over directory entries, 0 size files may be created for the file-type entries, and empty directories may be created for the directory-type entries. Short name order may be preserved for all entries, by creating them in a sorted order by their short name. Also for missing entries (i.e. if a MSFT'—'2.doc exists, then MSFT—4.doc is missing), dummy entries are created while the directory is being prepared, which may be deleted at the end. The size information of a file-type entry may be kept in its date-field (since we don't want the entry taking up any disk space). This size can be properly passed back to a query-directory system call, for apps that depend on the correctness of this value. If P' is a file, then an empty file may be created at COFU_FS_PATH\P' and then the data from P' may be copied into COFU_FS_PATH\P'. Remember that COFU FS may have been prepared for P'. P'=P'+next token from P.

Redirection to COFU FS of the original request may be done by prepending P with the COFU_FS PATH prefix, resulting in the name "COFUFSPATH\P", and then letting the calling process proceed with its access request.

An optimization that is done in the COFU FS preparation algorithm may be Copy On Intent to Write semantics (COIW). This means that if an Isolated Context process accesses path P, then it can be redirected to COFU_FS_PATH\P if it wishes write-access to P, or if COFU FS has been already prepared for P by an earlier request; if the process wishes read-only access to P, and the COFU FS has not been prepared for P by an earlier request, then the algorithm may let the process access P directly, since the process typically does not have an intent to modify P.

The above COFU optimization maintains common file-system semantics for The Isolated Context while presenting a Copy On Intent To Write view of the original FS, while handling long and short name based accesses.

Copy on First Use (COFU) can also be used with respect to the system registry. The goal is to present the Isolated Context with a view of the system registry, such that any changes made by the Isolated Context are only visible to it, and not to the Protected Context.

To support Registry COFU the Native API entry points of the NT Kernel can be intercepted and specific work is done for the Registry related calls. The work generally falls into handling Create and List. Where the path to a key may be copied over during a Create operation, and a key's underlying sub-keys may be copied over (only one level deep) for a List operation.

When a Key path is accessed by an Isolated Context process, the COFU Hive may be prepared to handle this path, and then the key access may be redirected to the COFU Hive. The COFU Hive can exist as a Sub-key, and will be referred to as the COFU_REG_HIVE. The items that are copied over from the original Registry into the COFU Hive may be at the granularity of keys.

The COFU Hive preparation algorithm, for a given Registry path R (where R is accessed by an Isolated Context processed), may first check whether COFU Hive has already been prepared for R. If not then it may take the following actions: if R consists of tokens "\a\b\c", (where each token is separated by '\'), then starting at the root token (i.e. '\a'), COFU Hive is prepared for path R' (where R'='\a' initially). If R' doesn't exist in the real Registry, then the algorithm may stop and considers COFU Hive prepared for R. If access is a Create (or Open), and R' exists in the real Registry, then a COFU_REG_HIVE\R' may be created, and all the data-values that R' contains, are copied into COFU_REF_HIVE\R'. However, no subkeys are copied over at this time. If access is a List operation, then for each subkey of R' create a subkey under COFU_REG_HIVE\R'. This may not be recursive, and only goes one level deep, for this request. Remember that COFU Hive has been prepared for R'. Then, R'=R'+next token from R. The COFU Hive preparation algorithm typically uses the Copy On Intent to Write (COIW) optimization, where if an Isolated Context process makes a read-only request for a Key R, and R has not already been copied over, then the process gets direct access to R.

This approach maintains common system registry semantics for the Isolated Context while presenting a Copy On Intent To Write view of the original Registry.

In order to achieve a higher level of performance than can be attained with Copy On First Use (COFU), while simultaneously achieving better isolation than possible through Copy On Write Intent (COWI), it is possible to employ copy on write virtualization (COW).

Copy on write is an optimization strategy, wherein the fundamental idea is that if multiple callers ask for resources which are initially indistinguishable, pointers can be given to the same resource. That is, until a caller attempts to modify its copy of the resource. When that happens, a true private copy is created to prevent the changes from becoming visible everyone else. Copy on Write has the advantage of being able to defer file copies until the first actual write event occurs, copy only the modified (or lost) portions of files upon a write event, and elide file copies entirely in case no write event occurs.

If file copies can be elided, this has the additional side benefit of minimizing the staleness when the Isolated Context and the Protected Context views of the filesystem diverge.

To implement COW on filesystems, it's necessary to interpose between the underlying filesystems and the application to supply a virtualized view of files. Further, it's necessary to intercept all modifications to file content, both on the Protected Context and on the Isolated Context side, in order to copy file contents on demand.

On Windows, the crux of the COW implementation may be concentrated on creating a virtual representation of the underlying file, in the form of a file object $FO_{xs}$, which may be provided to the Isolated Context, while read operations are directed to the underlying file object $FO_{original}$, and write operations can result in copy events to the backing file object $FO_{cow}$.

The COW optimization can be implemented as follows. The first step is implementing a filter driver above the filesystems to COW. Then terminate the Isolated Context Create events to the underlying filesystem by taking over the supplied file object abstraction, creating $FO_{xs}$, or redirect the Isolated Context Create events to either a path on the backing filesystem (which may be the same filesystem), where another filter handles the event by forwarding it down to the underlying filesystem, which may create a file object $FO_{xs}$, which may also functions as the backing file $FO_{COW}$, or a path on a pseudo filesystem, which may terminate the Create by taking over the supplied file object, creating $FO_{xs}$. Then the system must keep track of Protected Context opens to COWed files, in order to catch the Protected Context copy events. If a full copy of the original file does not already exist, (or if the file only exists in the virtual filesystem copy) do a recursive Create of the original file, $FO_{original}$. Upon a copy event, create the backing copy of the file if it does not already exist, and do the coping to the resulting $FO_{COW}$. Subsequently, read copied data from $FO_{COW}$ while unmodified data is read from $FO_{original}$.

Note that copy events which induce the creation $FO_{COW}$ and the copying of some or all of $FO_{original}$'s content and attributes include at least the following: the Protected Context write to file; the Protected Context file truncation; potentially the Protected Context file deletion, depending on the level of isolation wanted; potentially a Protected Context Create with incompatible sharing requirements; potentially a Protected Context rename of original file; potentially Protected Context lock requests against the original file; Protected Context file attribute modification; Isolated Context write to file; Isolated Context file truncation; Isolated Context file extension; and other Isolated Context attribute modification.

Figure 9:
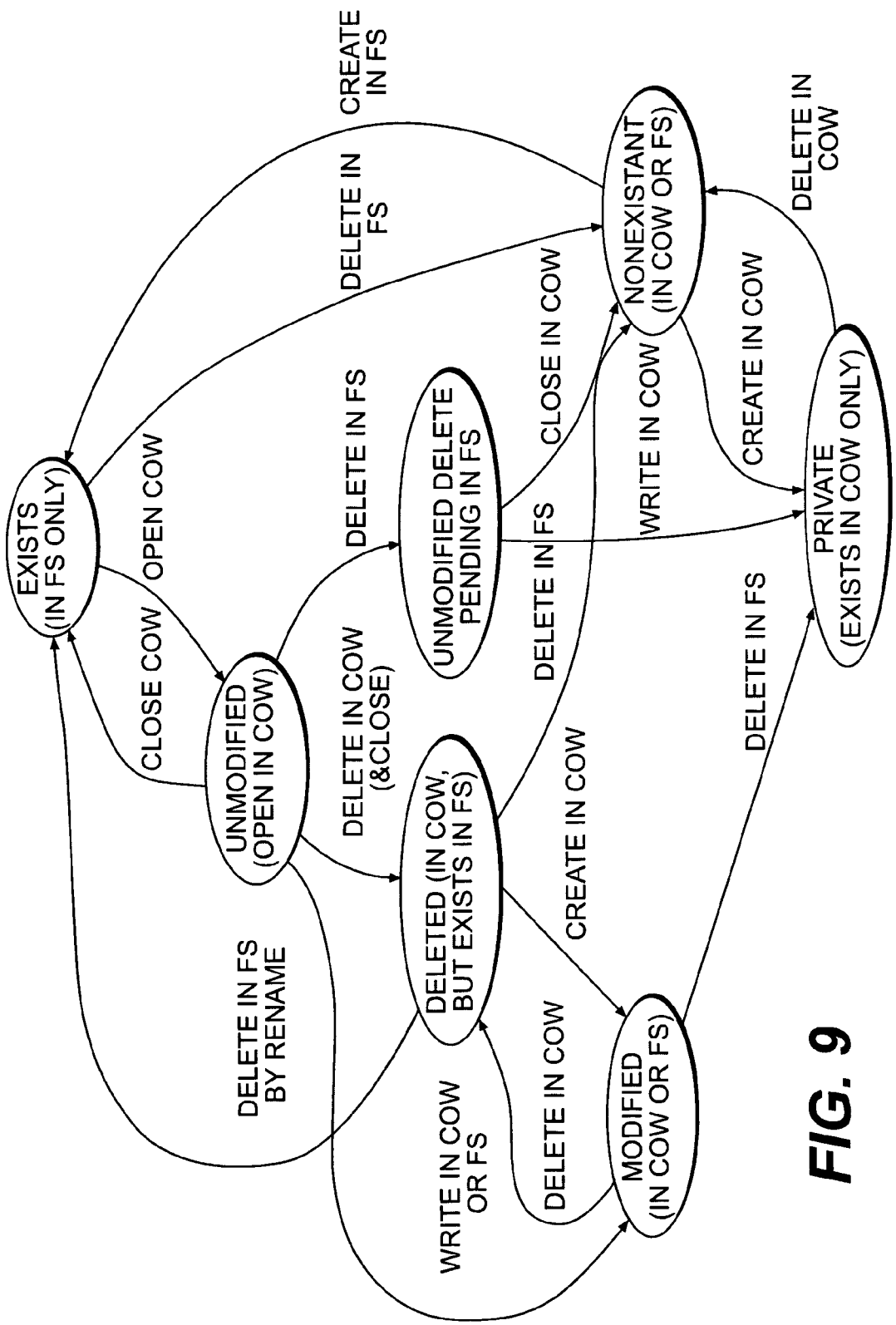
FIG. 9 is a conceptualization of a possible state chart of COW file transitions according to the security solution of the present invention.
Figure 10:
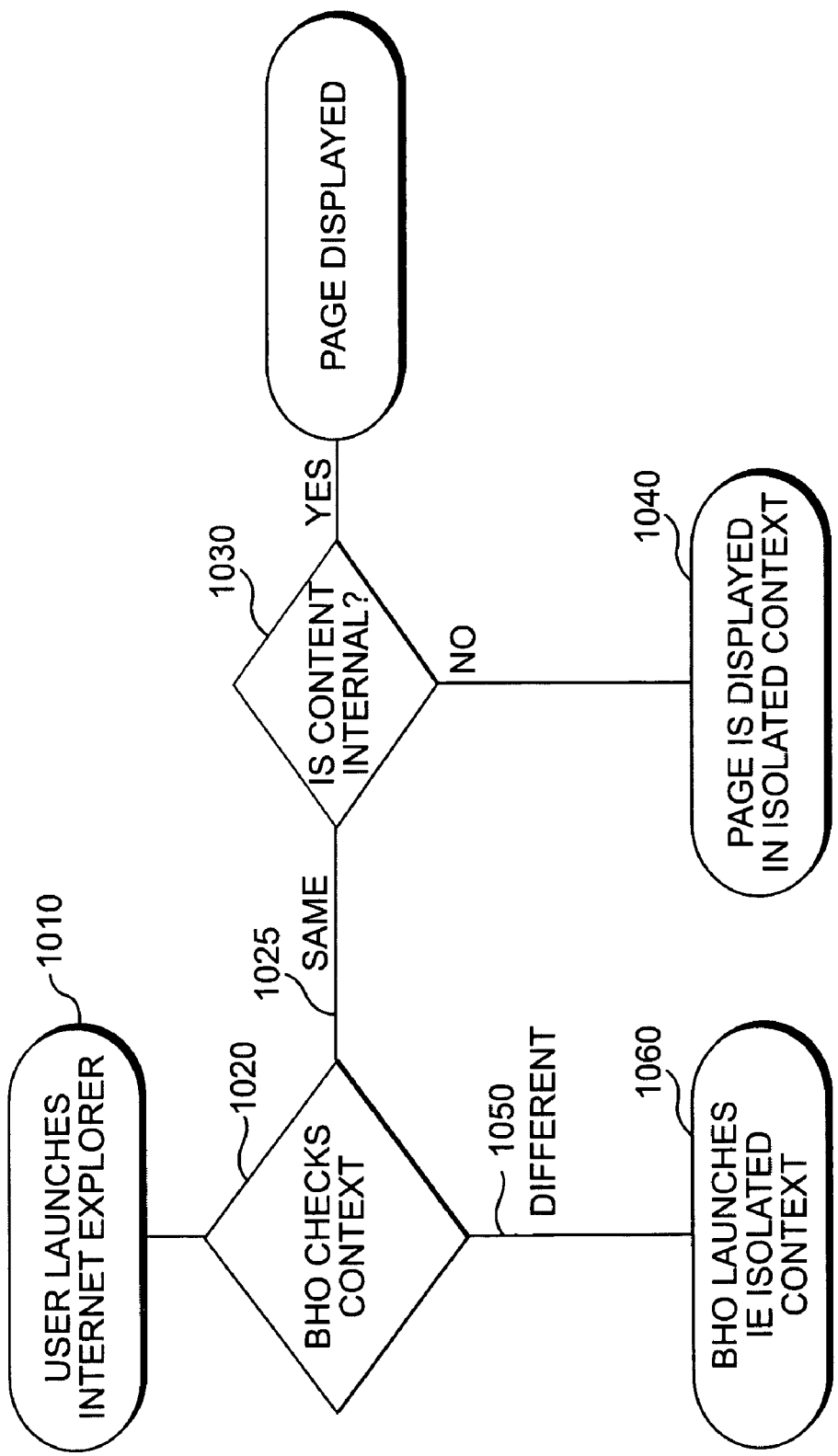
FIG. 10 is a illustration of a method for consolidating user interfaces in Internet Explorer according to the security solution of the present invention.

FIG. 9 illustrates one possible state chart of COW file transitions. This state chart aims for minimal divergence between the Protected Context and the Isolated Context views of the filesystems and thus minimal staleness, which may clearly manifest in such transitions as Unmodified→Nonexistent, and Deleted→Exists upon deletion and subsequent recreation of the original file in the FS.

COW optimizations can also be used with respect to the system registry. One way to virtualize the Windows registry in a way that causes minimum staleness, may be to allow the Isolated Context policy-based access to the real registry (which means sometimes, access may be denied but other times, access can be had to read keys from the real registry), and to virtualize by making any writes to the registry (except to parts of the registry that are "shared" by policy) go to an Isolated Context copy of the key that is being written to. This virtualization can be achieved in User Mode by patching the Win32 registry APIs in the Isolated Context and proxying them over to the Protected Context, and performing the following actions in the Protected Context, on either the Windows registry, or a virtual copy of certain keys from the registry. Thus, if the action is to read and the key being read from exists in the virtual copy, allow read from the virtual copy. If the action is to write and the key being written to exists in the virtual copy, allow a write to the virtual copy. If the action is to delete and the key being written to exists in the virtual copy, delete the key from the virtual copy, and store an indication in the virtual copy that this key should not be seen by the Isolated Context. If the action is to read and the key being read from does not exist in the virtual copy, allow read from the real copy if the policy for the key is Shared or Disclosed. If the virtual copy contains an indication that this key (or any of its parent keys) should not be seen by the Isolated Context, return an error indicating the key could not be found. Otherwise, return an access denied error. If the action is to write and the key being written to does not exist in the virtual copy, create a virtual copy of the key, and then allow a write to the virtual copy, unless the policy is Shared in which case the write goes straight through, or Confidential, in which case the write is disallowed (return an access denied error). One exception, however, is if the virtual copy stores an indication that the key (or any of its parent keys) should not be seen by the Isolated Context, return a key not found error.

If the action is to delete and the key being written to does not exist in the virtual copy, store an indication in the virtual copy that this key should not be seen by the Isolated Context. If the action is to create and the policy is not Shared, allow the Isolated Context to create the key in the virtual copy. Otherwise allow the Isolated Context to create the key in the real registry. If the virtual copy stores an indication that the key should not be seen by the Isolated Context, remove this indication.

The simplest way to store the virtual copy is to store it in the real registry, e.g. in a hive specifically created for this purpose, and protected from prying eyes via e.g. a DACL that allows access only to the process that handles the proxied registry calls.

It should be obvious that the above approach typically minimizes staleness in the view of the registry the Isolated Context sees, since all changes may be immediately seen by the Isolated Context, unless they are on keys that the Isolated Context has changed or deleted in its view.

Service Mediation

For other resources, those which don't have a standalone context-free state, such as, for example, communications ports on well-known addresses which provide communication pathways carry service requests to system services, may be virtualized through other means than copying.

Such virtualization can take the form of duplication, where the communications port connects to a new component, providing the same or similar service to that provided by the system service. Another method is to interpose and proxy or filter the communications to the system service, to provide protection against exploits of errors in the system service, or to block requests that the restricted environment can't be allowed under the new restrictive security policy.

Resources in the Protected Context are preferably not directly accessible from the Isolated Context and vice-versa. However, many resources should be accessible from the Isolated Context when the user intends them to be, or in a limited manner to give usability. The resource types include: COM Servers, as COM activation and access must work between applications running in the same environment; printers, files; and IP communications.

One of the embodiments that mediates resources and allows them to be used by the Isolated Context is subsetting, which can, for example, allow secure Clipboard sharing between contexts.

Currently Clipboard may be directly accessible by both the Isolated Context and the Protected Context, therefore to ensure safety when the Protected Context accesses data from the clipboard which was placed there by an Isolated Context process, the clipboard may be sanitized. Sanitation upon Protected Context Access uses OpenClipboard and CloseClipboard hooks in User Mode DLLs. The clipboard typically contains a sequence number, which may change every time it is modified. Every time the Protected Context modifies the clipboard and closes it, this Sequence number may be remembered in a persistent location (such as, for example, the System Registry). OpenClipboard hook in user-mode may be used to detect when a Protected Context is accessing the clipboard. At this time, if the last recorded Protected Context Sequence number does not match the current Clipboard Sequence number, then this a Sanitization of the clipboard is needed, since the Isolated Context probably modified the clipboard. Then, at this time the OpenClipboard call is blocked, and a request is sent to a Clipboard Sanitization Proxy running in the Protected Context.

The Clipboard Sanitization Proxy, opens the clipboard, and extracts known good formats out of it (e.g. plain text, simple images), it may then empty the clipboard, and replace the known good formats it extracted earlier. It may then close the clipboard, which can update the Sequence number in the System Registry as a side-effect, marking the clipboard safe for Protected Context access.

The process is similar for Isolated Context access. However, due to UI restrictions placed by the Job Object inside which the Isolated Context processes can be run, if one Isolated Context process places items on the clipboard, another process may not access them. The same scenario arises if a Protected Context process places items on the clipboard, the Isolated Context process may not access these either.

To allow an Isolated Context process to access items on the clipboard, placed by other processes the following actions are taken. The process is able to enumerate the formats present on the clipboard, even though it can't access the data for the individual formats. Then, when the Isolated Context process makes a request for the data of a particular format, and it is not able to retrieve it, the call may be blocked. A request may be sent to a Clipboard Proxy running in the Protected Context over a Named Pipe, with the format identifier that was requested. The Clipboard Proxy in the Protected Context may be able to access these formats, since it may not be running with any access-controls with regards to the clipboard. It may send back the data of the requested format over the Named Pipe connection. The original call may then be completed with the data that is retrieved via the proxy. The storage for this data is locally allocated in the Process's address space, and may be cleaned up when the Process closes the clipboard. The assumption here is that the process would have made separate copies of the data retrieved from the clipboard, as it is relinquishing control of the clipboard.

This allows sanitized, or secured, data to be accessed by the Protected Context Processes, if the original data was placed on the clipboard by the Isolated Context Processes. It further allows the Isolated Context Processes to access data placed on the clipboard by other Processes.

Drag and drop functionality in Windows can also be securely maintained, despite mediated access, using a process, which can be considered "whitewashing."

Processes running in the Isolated Context are virtualized from the Protected Context, however to facilitate usability the user drag-and-drop and cut-and-paste some well-known formats which can be marshaled across process boundaries. This task may be performed by a component called DnDProxy. The DnDProxy architecture includes the following components: a WindowFromPoint ( ) hook in each Isolated Context process; a DnDProxy running inside the Isolated Context; a DnDProxy running outside the Isolated Context; changes to GB Server to launch both DnDProxies; changes to GBSysDrv (kernel mode) policy on named Pipes to allow the Isolated Context DndProxy (GB_DnDproxy) to talk to the Protected Context DnDProxy (Real_DnDProxy).

In implementing this whitewashing from the Isolated Context to the Protected Context, the WindowFromPoint ( ) hook inside a security solution process initiates the actions. When a DnD is in progress and the built-in DnD logic at the Source requests the current WindowFromPoint ( ), this hook checks whether the window that is really under the cursor is a security solution window or not. If the window is a non-security solution window, then the handle to the security solution DnDProxy window is returned instead. This forces the source-side DnD logic to treat the security solution DnDProxy window as the target.

The security solution DnDProxy is registered as a valid Drop Target. When it starts receiving callbacks (see MSDN documentation on IDropTarget), It can take two different types of actions. If the Callbacks are for communicating the Drop Effect (i.e. the Source offers the capability to Move or Copy the data, and the Target responds by saying it wishes to only Copy, or only Move), then the security solution DnDProxy opens a pipe to the Real_DnDProxy. It constructs a list of available formats, and the offered Drop Effect, and writes them to the Pipe. The Real_DnDProxy reads these formats and the drop effect, and uses them perform a parallel Drag and Drop operation on the actual Target window that is currently underneath the cursor. It first completes this operation quickly (by canceling it) so it can write back to the security solution DnDProxy which Drop Effect the Real Target prefers. The security solution DnDProxy takes this information and completes the callback in which its sitting. This forces the real Source logic to then change the cursor appropriately (i.e. show a + sign, or a denied sign etc.). This sequence of events continues, until the user releases the mouse and an actual drop happens.

When a Drop happens, the security solution DnDProxy performs essentially the same actions as above, it packages the Drop Effect offered, and the format list offered, and sends them on the pipe to Real_DnDProxy. This time however, the Real_DnDProxy does not cancel the operation, it lets the Drop complete onto the Real Target window. When the Drop is in progress, the Target Window enumerates the format list offered by Real_DnDProxy and then starts asking for individual pieces of data. The Real_DnDProxy either already has this data in a cache, or has to request it from the security solution DnDProxy.

Please note that sanitation is performed by choosing the formats of the data being offered. Also for file drops, a default user folder in the DocAndSettings\[user]\Local Settings\Temp\[uniquename] will be created so tagged files, can be transferred from the Isolated Context to the Protected Context.

In implementing DnD from the Protected Context To the Isolated Context, the actions are exactly as above, except they are reversed. The Real_DnDProxy here is the initiator (Source), and the security solution DnDProxy is the acceptor (Target). Also the sanitation list is more lenient (i.e. HTML content is allowed), however we can still work with known formats.

In order to mediate the resources available to the Isolated Context, it is further necessary to maintain COM Separation and Activation Between the restricted execution environment and the local environment. RPCSS sections COM running object tables may be based on multiple criteria. One of these criteria is the session ID of the caller's process token. So COM separation can be provided by changing the session id of the process tokens of processes running in the untrusted environment. However when RPCSS gets a COM activation request, it may inspect the token of the calling process (or thread depending on the cloaking flags set) and, if the token has non-zero session id, it assumes that the requestor process is running in a Terminal Services session. So it then delegates the process creation by connecting to the following pipe "\\\\.\\PIPE\\Terminal Server\\SystemExecSrvr\\<Session Id>". This pipe is normally hosted by Winlogon.exe which receives the activation request and calls CreateProcess with the parameters specified in the data coming in on the pipe.

So to make COM activation work, create a pipe with a name in the above specified format. Then, when RPCSS sends an activation request to this pipe, decipher the activation parameters and create a new process and return the handle to the process and the primary thread on the pipe. Next, change the token session id of the new process. To avoid conflicting with actual Terminal Services sessions use negative session ids for the tokens of the processes running in the untrusted environment.

Since the goal of the invention is to allow possibly malicious external content to run in an Isolated Context, while still allowing the user to see this external content and work with it, while working with internal content in the Protected Context, it is further necessary to allow for a drag and drop implementation that allows for using a drag and drop between the two contexts.

When the user initiates a Drag-n-Drop operation from one space and is currently dragging the mouse over windows belonging to another space, as far as objecting linking & embedding (OLE)32 is concerned, those windows do not have any registered drop targets. This is because the above mentioned access restrictions across spaces make it impossible for OLE32 to retrieve the information required from the other window. When this happens, the security solution extends the OLE message pump to invoke a DoDragDrop loop in the other space if the cursor is over a window that belongs to a different space. Correct input may also be fed to the DoDragDrop loop in the other space.

This feature is implemented using the following process. First, intercept the DoDragDrop API. Then, wrap the passed in IDropSource pointer with the security solution IDropSource implementation. When the QueryContinueDrag method of the security solution IDropSource interface is called the security solution will do the following: invoke the original QueryContinueDrag; if the original method call does not return S_OK, simply return with that value; check the current cursor position and the window under that cursor and if the window belongs to another space, change a state in a member variable of this class and invoke a method call into the other space (through the standard cross-space COM invocation mechanisms) passing in the security solution IDropSource and the IDataObject interface pointers and this method call may invoke the DoDragDrop API in the other space using the passed in IDropSource and IDataObject pointers; when the inner call returns remember the return value of the inner DoDragDrop call. If the inner loop returned DRAGDROP_S_DROP, then remember this and return DRAGDROP_S_CANCEL. This may cause the outer DoDragDrop loop to exit. When control is returned to the security solution DoDragDrop intercept, the security solution may query the saved return value from the inner DoDragDrop loop. If this return value is DRAGDROP_S_DROP, the security solution may return that to the caller. Otherwise, the security solution may simply return the actual return value to the caller.

While within this inner DoDragLoop, the above QueryContinueDrag method may get called again. Based on the state that the security solution sets above, the security solution may do the following: check the current cursor position and the window under that cursor; if it belongs to the security solution space return DRAGDROP_SCANCEL (this may cause the inner DoDragDrop loop to exit); if the window belongs to the other space call the original QueryContinueDrag method and return with that value.

The logic within the inner DoDragDrop loop (that is running in the other space) is as follows: set low-level mouse and keyboard hooks; call the DoDragDrop API with the passed in IDropSource and IDataObject interface pointers; when the security solution low-level hooks are invoked, construct a mouse or keyboard message that is appropriate to the actual input that is happening and post it to the current thread. This may cause the DoDragDrop loop to receive input correctly even though it does not have the mouse capture or the keyboard focus.

Users preferably should be able to print from applications running in the untrusted or isolated environment. However, in order to allow this, access to the Spooler LPC port preferably should to be granted to the untrusted environment. Doing so may pose a security risk because applications in the untrusted environment may now have access to all the services provided by the spooler which include registering print processors, print providers etc. Besides, certain printers work in the following manner: during the printing process from within the application the in-process component of the printer driver may create some data files which then should be used by the component of the printer driver running in the context of the Print Spooler service. This may pose a problem because the files that are created from within the untrusted environment may not be accessible from the context of the spooler service.

So, an alternate printing scheme is preferred which provides printing services to applications in the untrusted environment without completely opening up the spooler service and without the other mentioned problems.

Access to the spooler LPC port may be denied to the untrusted environment. Printing services may be provided using a combination of the following methods:

For services such as printer settings UI, calls to user-mode APIs such as DocumentProperties, PrinterProperties and AdvancedDocumentProperties will be intercepted and proxied over to the trusted environment. The output DEVMODE structures may be marshaled back.

When a printer device context is created using the CreateDC call, a metafile device context may be provided to the application. GDI calls made by the application may be recorded into this metafile. When the printing is done (signaled by a call to the EndDoc API) this metafile may be marshaled across to the trusted environment and replayed into the actual printer device context.

When the application queries for device context attributes using APIs such as GetDevicecaps, this information may be provided to the application from a cache of attributes (this cache will be initialized in the trusted environment during the actual call to CreateDC).

User-mode applications typically interact with printers in a manner as follows. The application typically makes a call to an API such as DocumentProperties. This call puts up user-interface that allows the end-user to select various printing options such as paper-size, color, paper-tray, duplex printing etc. This API may collaborate with the printer driver user interface DLL in presenting the UI. The options that the user selects may be returned in a DEVMODE structure. The application then may make a call to the CreateDC API passing in the name of the printer and the DEVMODE structure that may be obtained from the above step. This API may return a handle to a device context on success. The application may then makes GDI calls onto this device context. Printing may start with a StartDoc call and end with an EndDoc call. Page breaks may be inserted using StartPage and EndPage calls. The application may also use APIs such as GetDeviceCaps to retrieve attributes about the device context such as resolution and size and color depth.

The proposed printing solution, provided to allow users to print content from the Isolated Context may be as follows. First, hook the call to DocumentProperties (and other APIs of the same family such as, PrinterProperties, AdvancedDocumentProperties) to this to the calling application. Also create a mapping between the metafile DC handle and the actual DC handle. Then, GDI calls made by the application may be recorded in the metafile. StartPage and EndPage calls will be recorded in the metafile by using the GDIComment API. Calls made by the application to query the attributes of the device context will be satisfied from the attributes cache.

When the application calls EndDoc, the metafile may be serialized and marshaled to the trusted environment and played into the actual printer device context. The marker GDIComment calls may be replaced by StartPage and EndPage calls.

In order to be able to perform proxying of services from one security context to another, it is preferable to be able to patch User Mode APIs. This can be done by using a technique known as Export Address Table patching.

The list of functions that a DLL exports is listed in the Export Address Table (EAT) which is part of the Portable Executable (PE) image header. The addresses listed in the EAT are relative addresses (RVA) to code within the module. Also Windows has a feature called export forwarding. It is possible to specify that a certain exported function if actually forwarded to a function in another DLL. In this case the address listed in the EAT may be actually a relative address that points to a string of the format "ForwardedDLL.FUflctiofIName". So there is the question of how the loader recognizes that the RVA actually points to a string and not to actual code.

The approach of the security solution may be to modify in-memory the EAT of the target DLL as soon as it is mapped into memory and adjust the entries for the functions that we wish to intercept such that they point to strings which are of the format: "<Interceptor DLL Name>.<Intercepted Function Name>". For this approach to work the security solution strings preferably are within the exports section. To achieve this, the security solution may allocate for a new EAT for the DLL (where the size of the new EAT is large enough to include the security solution's strings) and the security solution may copy over the old EAT into this memory section and write the security solution's forward strings at the end. Then, the security solution needs to adjust the functions array in the EAT to point to the RVA of the security solution strings and adjust the export table DataDirectory entry to point to the newly allocated EAT. This can also be achieved by writing the old RVA for the intercepted function at the end of the forward string. This is so that the security solution interceptor function can call the original API.

As stated above, the security solution may do the interception when the target DLL is mapped into memory. The loader may use the ZwMapViewOfSection system call to map a DLL into a process address space.

The intercept method of the security solution may first call the original system call. If this fails then exit. Then check to see of the section being mapped is an executable image. These checks will be: the name of the section for the format "KnownDLLs\<DllName>", and if yes, then a known DLL is begin mapped and then the security solution will perform an interception; otherwise it will see if this section is an image section backed by a DLL by intercepting ZwCreateSection and maintaining a lookup table of section object to DLL name. Then, if this is a DLL being mapped into a process that we are interested in and if this DLL has functions needing to be intercepted, the security solution will do the above interception scheme.

For each DLL that the security solution wishes to intercept, it can create the altered EAT in a shared section up front when the security solution client system starts up. It can also then simply map this section into the address space of the processes of interest.

In the interceptor DLL, the security solution can read the original addresses of all the intercepted APIs (the original addresses are stored at the end of the forward strings) and fix up the import address table (IAT) of the interceptor DLL with the original addresses. This will enable the security solution to directly call the original APIs.

In order to maintain transparent isolation to the user, while mediating the resources available to the Isolated Context, in a Windows environment, it is essential to be able to provide the services of Explorer.exe to the Isolated Context. Such Explorer.exe functions as traybar notification icons, taskbar buttons, the desktop window, and dynamic data exchange (DDE) services can all be provided to the Isolated Context by proxying, using various forms of API interception as discussed above.

To minimize the coding needed to proxy/subset a given set of APIs, a code generator may be used, which generates most of the necessary code. This code generator may take as input a file that contains declarative rules for what to proxy (i.e. which APIs); how to patch what to proxy (e.g. using EAT patching, or preamble patching); where to proxy it from (e.g. any Isolated Context process, a particular process in a particular space); optionally, how to proxy data structures over (similar to the way IDL describes how data structures are transported over remote procedure call boundaries); optionally, what the allowed subset of values for a given parameter is (static parameter validation); optionally, CLSID of a COM object that should be used in the destination context as a "parameter validator" for the parameters of a method (dynamic parameter validation); and CLSID of a COM object to use as a "proxy endpoint" for the procedure being proxied, in the destination context.

The code generator will parse and validate the input file, and generate the following output if it is valid: code that will run in the origin context and take care of patching the functions that should be proxied; interface definitions (IDL file) for the interfaces that need to be exposed to the origin context by the destination context so that the calls can be proxied over, and data definitions (same IDL file) for the data types that may be used in these interfaces; code for a COM object that will run in the origin context, may receive calls to the proxied functions, and ferry them over to the destination context over the supplied interface (via the COM Proxy); code for a COM interface that will be exposed to the origin context that allows the origin context to fetch the COM object in the point above; code for an object to be instantiated in the destination context, that takes care of creating the object from the last point in the origin space (e.g. via ISpaceProxy: :CreateInstance in the Isolated Context), thus making the proxying ready for use; interface definition (IDL file) for interface(s) that need to be implemented by the different parameter validators and proxy endpoints specified in the input file (this interface is preferably generated because its methods and their parameters preferably match what is being proxied over); code for an implementation of the proxy endpoint interface from the above point, which runs any parameter validation specified in the input file, then may call the proxy endpoint specified in the input file; and code for a default implementation of the proxy endpoint interface, which returns an HRESULT for each method that performs the default action that specifies that the object from the above point should perform the default action, which may be to call the API with the same name as the one that is being proxied.

In addition to the generated code, a lot of non-generated, framework code is used, including the COM Proxy, a framework for the proxying components that run in the origin context, and a framework for the proxying components that run in the destination context. The security solution depends heavily on IDL and COM in general to create the actual interfaces that is used to communicate between spaces, but note that the IDL is generated from the security solution input file with declarative rules.

The way this code generator could be used may be that before invoking the compiler for the programming language used by the security solution (preferably C++). This could build all the necessary source files which could then get built by the compiler used by the security solution.

The security solution entry point applications like Internet Explorer and Outlook can bring external content into the enterprise. This content is typically in the form of files like Word documents, html files, Images, etc. External content brought into the enterprise is tagged by the security solution (GB tagged) in one of two ways. It is either mangled or the security solution appends a GB tag to the file name to identify it as a GB tagged file.

To access these files, the corresponding application preferably runs in Isolated Context as Protected Context cannot read or write to these files. The security solution takes over the shell namespace on the client, which provides a documented way of hooking the shell launch mechanism wherein the security solution can take decisions based on the verbs being executed.

Every shell object is identified by a PIDL (Pointer to an item identifier list). GB files are also shell objects and have corresponding PIDLs.

When the user right clicks on a file in the shell view a shell object called the context menu is instantiated which displays a popup menu containing actions/verbs which can be taken on the file. This object implements the following shell interfaces: IContextMenu, IContextMenu2, IContextMenu3.

As mentioned above the security solution may hook the entire shell namespace, meaning it may hook the context menu object as well. For non GB tagged files, meaning files in Protected Context, it merely forwards the interface calls made on the context menu object to the actual context menu object. For GB tagged files it may launch space servant in Isolated Context which, hosts a parallel context menu object for the PIDL (GB tagged file). Interface calls made on the original context menu meaning the context menu object living in Protected Context (For e.g. Explorer) may be forwarded to the context menu object in Isolated Context. These calls include the call to QueryContextMenu which can populate the context menu with the verbs which can be executed on the PIDL, calls to HandleMenuMsg which is typically used for owner drawn menu items, and the call to InvokeCommand which executes the selected verb.

The reason for hosting a parallel context menu in Isolated Context is that there could be actions like changing the file associations for the file through the open with menu, etc. This information may be written to the registry, which is virtualized for Isolated Context. As a result of which the menu items in Isolated Context and Protected Context could differ. Hence having a parallel context menu for the PIDL (GB file) in Isolated Context typically brings up a menu which has relevant verbs in it.

There are verbs which execute preferably in Protected Context. These include verbs like Create Shortcut, Send to Desktop, etc. The list of verbs to execute in a context other than Isolated is specified in the security solution policy, which may be downloaded by the client on startup and during user login. For these verbs, when the InvokeCommand method is invoked on the context menu, the security solution may look at the verb being executed and resolve it to its string form if possible. It may invoke the GetCommandString method on the context menu object in Isolated Context. The string returned in the above call may be looked up in the policy and if the verb is to execute in a different space we then may execute the call in the right space. For example, if the verb is to execute in Protected Context, the security solution may forward the call to the original context menu after populating the context menu with the menu items from Protected Context. Then it may invoke the QueryContextMenu function in the IContextMenu interface on the original context menu.

The security solution COM (GB COM) proxy may be a generic, bidirectional, secure communication bridge between the Isolated Context and the Protected Context.

All COM communication between the Protected Context and the Isolated Context may be blocked by the security solution client driver (GB ClientDrv), with one exception: the COM proxy is allowed to communicate in either direction and both the Isolated Context and the Protected Context is allowed to communicate with the COM proxy.

The COM proxy maybe capable of instantiating COM servers in the Isolated Context and establishing the communication between those servers and their clients. Instead of returning a direct handle to the actual the Isolated Context COM server to the Protected Context client, the COM proxy may create its own proxy manager which provides the functionality of a standard COM proxy manager (implements IServerSecurity, IMarshal, etc. and holds a map of RPC channel objects) with a few additions. The implementation of the proxy manager holds a reference to the actual target COM server and acts itself as the COM server to the Protected Context client. For each interface, the proxy manager holds a channel (IRpcChannelBuffer) object that again holds a vtable thunk for all the methods in the interface.

The implementation of the proxy manager will work for all COM interfaces that have registered PSFactoryBuffer implementation since it will use the factory buffer to load the proxy/stub pair for each interface being used and then simply pair together the SendReceive method of the COM channel object and the Invoke method of the stub. The result is that there may be no need to specially provide an implementation for any interface that is being proxied.

The proxy manager may also keeps track of important information about the actual server it represents, such as whether that server is running in the Isolated Context or the Protected Context. This way the COM proxy achieves two important things: first, the client receives a handle to an object running in the COM Proxy process and not the actual handle to the COM server, ensuring that communication will continue to go through the COM Proxy and not directly between the two processes. This is true for both the Isolated Context and the Protected Context COM servers, so the Isolated Context will preferably communicate with the COM proxy and the Protected Context will preferably communicate with the COM proxy. Second, the COM Proxy can enforce security rules on a per-instance basis and disallow or allow access dynamically.

The COM proxy exposes special control objects to the Protected Context that allows the Protected Context processes to allow access to certain the Protected Context objects from the Isolated Context, and then later revoke that access. Alternatively, the COM proxy can also recognize if objects implement a special COM interface which tags those objects as "always safe for the Isolated Context".

By hooking CoUnmarshal Interface and utilize a COM call context object for incoming, proxied, calls, the COM proxy may be able to dynamically identify any calls that are going between spaces and any [in] and [out] COM object arguments that are being passed, and take action accordingly.

Another method that can be used to allow COM to be able to communicate between contexts is to use a flexible inter-process communications (IPC) mechanism, based on SID injection, as discussed above.

The proposal is to use the facilities available through SID injection proposal to limit the possible communications between spaces through ACL manipulation. The communications between spaces may be limited to allowing communications between the Isolated Context and a per-space proxy process, running with the user's privileges on one hand, and the proxy and RS on the other hand.

In order to deny the Isolated Context invocation rights to the Protected Context, the idea is to intercept the CoInitializeSecurity API, and append a deny-The Isolated Context ACE to any Security Descriptor passed to that API.

To further enforce the Isolated Context/Protected Context boundary, it's possible to manipulate the ACLs of the underlying LPC Ports, pipes etc, to ensure that only the appropriate processes have access to each other. To this effect it is preferable to put a deny ACL against the Isolated Context SID on all Protected Context LPC ports, and put the ACLs to the Isolated Context processes to a list that grants only the proxy and each other access.

Another method for enabling the secure use of COM between the contexts is to use the distributed component object model (DCOM) for IPC between the contexts. This proposal suggests treating the two spaces as two separate servers and allowing specific tunneled DCOM access between the spaces.

In a further implementation of the proxying and subsetting mechanism, it is possible to mediate resources, while continuing to a maintain transparent isolation, by consolidating user's histories. To know when Isolated Context is changing the history, the security solution may hook all instances of the IUrlHistory interface within Internet Explorer. On calls to IUriHistory: :AddUrl, IUrlHistory: :DeleteUrl and IUrlHistory: :AddUrlAndNotify, the security solution may proxy these calls over to the Protected Context using a proprietary COM interface that may be exposed to Isolated Context via the security solution COM Proxy, it will then apply rules to the URLs so that URLs that pose little or no risk of compromising Protected Context are allowed across, and call the same functions on the IUrlHistory interface in the Internet Explorer in the Protected Context, with filtered parameters. The security solution may not proxy over calls to the IUrlHistory: :ClearHistory method, as it may be considered unsafe to let the Isolated Context clear all of the user's history.

To make favorites entries added in the Isolated Context also show up in the favorites list in the Protected Context and vice versa, the security solution will give the folder that contains the favorites (they are "shortcut" files) a Disclosed policy, so that Isolated Context can see files there from Protected Context, and it will use the User Intent mechanism to indicate User Intent when the user adds a new favorite. The User Intent mechanism is explained in detail below. This way, shortcuts added from Protected Context can be seen (but not executed) in the Isolated Context, and shortcuts that were added from Isolated Context become Restricted and can be seen (but not executed) in the Protected Context. By injecting logic into Internet Explorer via the pluggable protocol handler, the security solution can ensure that when the user chooses a shortcut that is Restricted, it opens up in an Internet Explorer instance running in the Isolated Context, and that when the user chooses a shortcut that is not Restricted, it is launched into an Internet Explorer instance running in the Protected Context.

To further maintain transparent isolation in, for example, a Windows environment it is necessary to be able to view external, untrusted email in Outlook, or other email clients. Rendering of untrusted HTML email in Outlook may be controlled by the security solution Outlook (GBOL) component. GBOL may intercept the initialization of the MSHTML "HTML Document" component and implements an aggregation of the HTML document code.

When an HTML email is about to be displayed in Outlook, the "load phase" goes through GBOL and before the load operation is allowed to continue the target URL (Moniker) may be examined and by also interacting with the "Trusted/Untrusted email distinction" mechanism, GBOL determines which action to take. If the target is determined to be trusted, GBOL stays out of the loop and may allow Outlook to render the HTML email as normal. If the target is determined to be untrusted, GBOL can synthesize and inject new HTML code into the aggregated HTML Document object and thereby starting preparation of loading the document in the Isolated Context.

The synthesized HTML code causes the HTML Document to load and initialize an ActiveX control provided by GBOL that may act as the Isolated Context host window for the untrusted email, now known as rhost. The rhost may communicate that the rhost's window can be safely accessed from the Isolated Context.

To allow the ActiveX control to be instantiated without a warning message from the HTML Document object, a temporary intercept may be activated during the loading of the injected HTML. This particular intercept may hook the ProcessUrlAction member function of the IInternetSecurityManager implementation provided by Outlook, and may return URLPOLICY ALLOW for the injected HTML code during the injection.

The rhost may then contact a servient process, called SpaceServant process, running in the Isolated Context and instantiate another ActiveX object in the Isolated Context that may act as the Isolated Context host, now known as the xhost.

Communication between the rhost and xhost may be done via the GB COM proxy and by use of normal window messages.

The xhost instantiates an HTML Document and starts the actual loading of the untrusted HTML content in the Isolated Context.

All user interaction (e.g. printing, copy text, window resize etc) and loading of potential subcomponents of the HTML document, such as embedded images and scripts, are handled by communicating those actions between the rhost and xhost.

User Interface Consolidation

In many cases, a single program may deal with both trusted and untrusted content within the same session, e.g. a web browser. In order to achieve the goal of transparent isolation, the security solution can make the user's experience more or less the same regardless of which type of content he/she is working with, and preferably it should be transparent for the user when he/she switches from working with trusted content to working with untrusted content or vice versa.

In a typical security solution environment, the administrator could specify network rules along with other client rules on the server. These network rules may specify as to which networks/subnets can be considered internal/secure and which networks are external/insecure. Protected Context may be allowed full access to the internal network and is denied access to the external network and vice versa.

The client downloads these settings on startup and during user login. The client may include a TDI filter, which may use the above network rules to decide whether to allow an attempted connection to an IP address to go through or not. The TDI filter may use the current context (Protected/Isolated) to make the above determination.

Denying access to external networks from Protected Context can have a significant impact on usability, as the user may be unable to browse external web sites.

The security solution employs an Internet Explorer switching feature that enables the user to seamlessly browse web sites by launching, Internet Explorer in the right context (Protected Context/isolated Context) by using the URL to decide the target context. The client implements a Browser Helper Object(BHO), and a Pluggable Protocol handler in conjunction to seamlessly switch Internet Explorer Contexts based on the URL. These objects, are loaded by Internet Explorer and Windows Explorer on startup and get notified at various points during URL navigation.

The algorithm used to switch IE contexts is as below: The algorithm attempts to minimize the limit the number of open, Internet Explorer Windows on the client to 2 if possible (1 internal and 1 external) window.

The first phase of the algorithm begins when the user launches Internet Explorer on the client machine 1010. Then, the BHO may query the target context for the URL 1020 being navigated to from the kernel policy component. If the target context is the same as the current context 1025, the BHO may return successfully. However, The URL being navigated to may be the home page. The Browser helper object queries the kernel policy component to get the target space for the home page. If the page is internal the BHO returns without doing anything 1030. If the page is external the BHO launches Internet Explorer in Isolated Context 1040 and closes the running Internet Explorer session. Then, if the context for the URL being navigated is different from the current context 1050, the BHO may launch Internet Explorer in Isolated Context 1060 and closes the running Internet Explorer session.

The BHO may remember information about the URL in an active request list and returns success, including: the URL; the IE request header; form post data; request flags; and frame information.

The second phase of the algorithm involves the Pluggable Protocol handler, which looks at the current URL and verifies, that it is an active request by using the active request list populated by the BHO above. It may then query the kernel policy component to get the target context for the URL. If the target context is different from the current context. It may switch IE to the right context and cancels the current request.

This algorithm allows the user to seamlessly browse the web by switching Internet Explorer contexts as required. However it could be implemented by other means. The security solution could aggregate with MSHTML and launch MSHTML in the right context as required. This scheme is employed by Outlook for rendering external HTML mail. It would be also possible to change Internet Explorer so that it natively understands the difference between trusted and untrusted content and switches between spaces accordingly.

A further method used to consolidate user interfaces is to render web pages with content from multiple security contexts securely in one user interface. One approach to rendering web pages with content from multiple security contexts involves implementing an ActiveX control or plugin that takes as a parameter, a URL to a page that should be rendered in the Isolated Context. This control may be intended to be used from a web browser process running in the Protected Context, and may do the following when it starts up, including: create a child window of the browser window that is sized the same as the ActiveX control's client area, and moves and gets resized along with the client area. This control could also create a process in the Isolated Context (e.g. using the security solution COM Proxy), and pass that process the window handle to the child window just created. The process in the Isolated Context may create an Internet Explorer web browser control, and cause it to render itself into a child window of the window created by the ActiveX control in the Protected Context, and make it stay the same size as the parent window. Effectively what the security solution has done is overlaid the area of the web browser that used to contain external or untrusted content, with a window that runs in the Isolated Context and is able to display web content.

The control could further command the process in the Isolated Context to cause the web browser control to load the URL that was passed to the original (Protected Context) control, or pass the content over e.g. through an IMoniker, IStream or equivalent.

After the control does one of the above, the next step is to maintain a process on the local machine that acts as a caching proxy server, rewriting HTML pages so that any area on the webpage that contains insecure embedded content (e.g. images, ActiveX controls, etc. from external sites) is changed into HTML that invokes the aforementioned ActiveX control, giving it a URL to the content that was rewritten, which may be cached in the proxy as a new web page. The last step is to change the proxy settings for the web browser to use the "proxy server" on the local machine, and cause the local proxy server to use the original proxy settings.

There may be some difficulties to this approach, particularly that of maintaining visual consistency when a single HTML page is rewritten into multiple HTML pages. A major tool to help in this respect is to convert the HTML into well-formed extensible markup language (XML) (e.g. using the publicly available Tidy library), and always rewrite whole "nodes" in the XML "tree" representation of the document.

It is then important to make sure that the Isolated Context web browser window gets a visual indication frame (discussed in detail below) around it, for visual indication to the user.

This method of implementation can also be used to ensure that URLs that are for untrusted web sites get displayed in the Isolated Context (even though the user is running Internet Explorer in the Protected Context). In this case, the entire page becomes displayed in the ActiveX control displayed above.

This embodiment is representative of a method of embedding content from multiple trust zones into a single user interface, where the method of achieving security is to run the part of the user interface that displays insecure content in The Isolated Context, and to visually indicate the parts that are untrusted.

An alternative way of solving the problem this embodiment solves is to change Internet Explorer so that it natively understands the difference between The Isolated Context and the Protected Context and takes steps similar to the ones above to make sure that untrusted content is preferably run in the Isolated Context.

Visual Indication of Trust Level

In order to provide protection against social engineering-type attacks, where malicious content or executables attempt to trick users into divulging sensitive information, such as e.g. credentials, it is preferable to provide the user a visual indication of the trust level for the execution environment presenting the interface. The preferred embodiment of this visual indication is a customizable colored frame, which surrounds the external or untrusted content that is executed in the untrusted environment.

Top-level windows created by applications in the untrusted environment are preferably visually distinguishable by the end-user from those created from within the trusted environment. This visual indication preferably happens in a secure fashion. For example, it should not be possible for untrusted applications to circumvent this visual indication. This visual indication preferably works for non-rectangular as well as rectangular windows.

The solution is to draw a frame around all top-level windows created from within the untrusted environment of a customizable color (default green) and width. This frame will be drawn in the trusted environment to make it secure.

Figure 11:
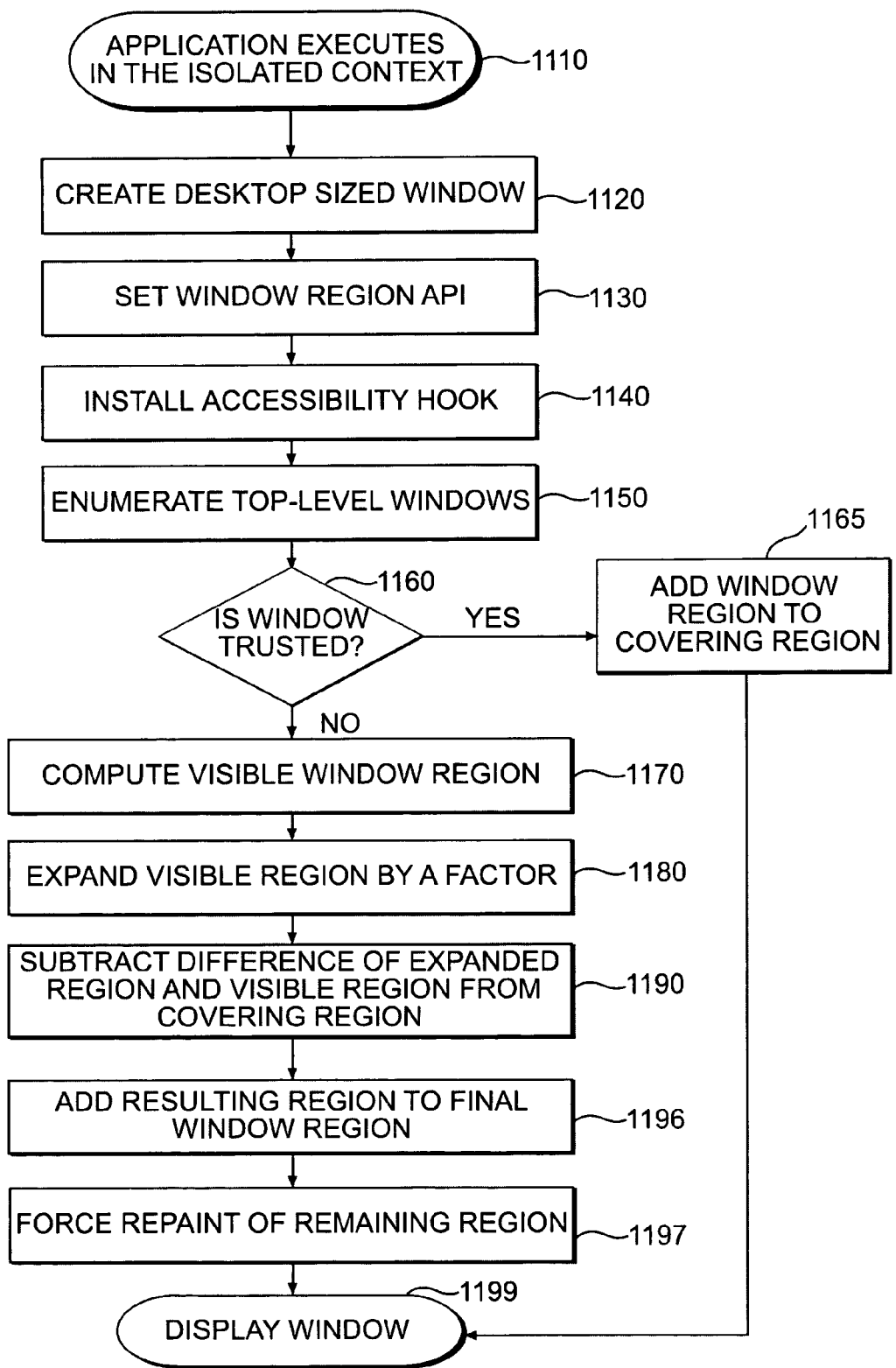
FIG. 11 is an illustration of a method for providing the user with a visual indication of the execution of content in the Isolated Context according to the security solution of the present invention.

This can be implemented as shown in FIG. 11. When an application is executed in the Isolated Context 1110, the following will be performed to provide a visual indication to the user. First, create a window large enough to cover the entire desktop 1120. The background color of this window will be the selected frame color. Call this the GreenFrames window. To begin with this window will have an empty visible region (set using the SetWindowRgn API) 1130. Next, install an accessibility hook 1140 (using the SetWinEvent API) to track events such as window creation, destruction, location changes along all 3 axes and visibility changes. This accessibility hook may be set up to be called asynchronously and out-of-process Then, the event handler do the following steps. First, enumerate all top-level windows 1150, and for each visible top-level window do the following will be performed. If the window belongs to the trusted environment 1160 simply add its effective visible window region to a region called the covering region 1165. Before the enumeration this covering region starts out as empty. However, if the window belongs to the untrusted environment do the above step. In addition, compute the visible window region 1170. Call this region A. Expand region A by some factor 1180. Call this region B. The difference between region B and region A gives the frame region for the window. Subtract from this the calculated covering region so far 1190. That gives the effective frame region for the window. Add this effective frame region to the final window region 1196.

At the end of the enumeration a final window region exists for the security solution window. Finally the event handler will set this region as the visible region of the GreenFrames window and force a repaint 1197 and display the window 1199.

During the enumeration the frame region corresponding to the current foreground window is saved in a variable and this is used in the WM_PAINT handler to draw that region in a slightly different color from the other windows. This is to provide a visual difference between the foreground window and the other windows.

For maximized and full-screen windows, the frame is actually drawn such that it overlaps over the window itself When a window is being moved or sized, drawing of green frames for that window is suspended until the move/size operation ends. This is a performance optimization.

A cache is maintained of all the calculated window region and frame region for each window. The cache entry for a window is invalidated when that window is repositioned or has its visibility changed.

It could also be possible to change the Windows operating system implementation of window drawing so that it would understand the concept of the Isolated Context and add colored frames to any application running in the Isolated Context.

When consolidating user interfaces, it is necessary to indicated trusted content within untrusted content. In this case, a different indication than the green borders mentioned in the above embodiment is preferred. While those are secure because their drawing cannot be affected by the Isolated Context, and the Isolated Context may have no way of falsifying them (making either a false positive or false negative indication of trust) the security solution implements an indication for trusted content within untrusted content that cannot be faked.

One way of doing this is: When the mouse pointer is over a trusted window that is embedded within an untrusted window, display an indication in a window that cannot be affected by the Isolated Context, such as a window on the Windows taskbar. This indication could take the form of an animated icon, and might include a "zoom" effect from the trusted area. While the "zoom" effect could possibly be partially faked by the Isolated Context, the animated icon could not be faked. This would therefore provide a secure indication that the mouse pointer is within an area that is trusted.

Since the overall goal is to have access to the untrusted files denied from the Protected Context, Windows icons can not be retrieved from those files unless the caller is running in the Isolated Context. This following mechanism allows icons for untrusted files be viewed from both the Protected Context and the Isolated Context in addition to providing a visual indication to the user that the untrusted file is indeed untrusted. This is done using a "Shell Icon Adornment" process.

The "Shell Icon Adornment" (SIA) project may be split into two parts. The first is loading icons for files that have been marked as untrusted, from the Isolated Context. The second part is adorning those icons with the security solution adornment tag.

The SIA relies on the shell intercept for detecting when the system needs to load icons for a given file A. Upon detecting that the file which holds the icon B, for A, is untrusted, the request for the icon may be redirected into the Isolated Context. This is done with the aid of the COM proxy.

The request for the icon can be processed in the Isolated Context and the icon may be marshaled back to the Protected Context caller. If an icon couldn't be loaded, a default icon may be provided. After the icon has been received in the Protected Context, the adornment process may take over.

If the file that hosts the icon (B) is trusted and file A is untrusted, the request for the icon may not be sent to the Isolated Context and the default mechanism for loading an icon may be allowed to proceed in the Protected Context. After that mechanism has loaded the icon or provided a default icon, the adornment process takes over.

The adornment process may be the process of merging two icons together. Firstly the icon received for the untrusted file (either from the Isolated Context or the Protected Context) and secondly the security solution adornment icon. This produces a third icon that will eventually be returned to the caller that initially requested the icon (typically Windows Explorer).

Discerning User Intent

When programs request that the operating system performs an action, e.g. creating a file, the "reason" for this action can be broadly categorized into actions that were requested explicitly by the user, e.g. to create the file "bla.txt" in a folder chosen by the user, or to print a file chosen by the user. Or, actions that were not requested explicitly by the user. Those actions can be further divided into non-malicious actions such as creation of a temporary file, opening an IPC connection to another process, etc., or malicious actions such as formatting the computer's hard disk, or modifying a system library to inject a virus.

Modern operating systems do not provide means to distinguish between these categories. Thus a novel feature of the security solution is the ability to differentiate, preferably in a secure manner, between the two broad categories of actions defined above. Actions in the former category are said to have User Intent.

Any method used to indicate that an action has user intent will fall into one of two categories. The first category are those actions that are secure. If a method is in this category, then code running in the Isolated Context is unable to forge or tamper with an indication of User Intent, and is not able to fool the mechanism used to detect User Intent. This is sufficient to ensure that the Isolated Context cannot create a false positive indication of User Intent. Some secure methods of detecting and indicating User Intent may also prevent the IC from creating false negatives, by preventing the IC from removing an indication of User Intent. The second category of actions are those that are insecure. Methods in this category make a best effort attempt to detect and indicate user intent, but do not fall into the Secure Indication of User Intent category.

Methods in the insecure category do not need to be proof against code running in the Isolated Context tampering with them or forging User Intent.

Because operating system APIs do not provide parameters to indicate User Intent, it must be encoded in the existing parameters, or somewhere else. The following methods are examples of methods used to encode User Intent in an insecure manner:

If the user is requesting an action on a named entity, encode the fact that there is User Intent in the name of the entity. This requires also hooking into whatever part of the system actually performs the action, to again remove the User Intent indication from the name of the entity so that the original name is restored.

Store the name of the action and optionally target of the action, in a per-process table, or keyed by the ID of the process requesting the action in a system-wide table, until the action has been performed, or until the action has been performed and for a short amount of time after that.

Store an indication of User Intent for the current thread of execution in thread local storage on the thread on which the action requested by the user is performed. Then, remove the indication once the thread's call stack winds back.

Temporarily change permissions (via operating system security) on named entities, to increase the effective permission that Isolated Context gets to them.

Or temporarily tagging entities (using one of the tagging methods discussed above) to indicate that the Isolated Context has access to the entity by User Intent.

As user-requested actions are usually requested via a user interface of some sorts, one method of detecting User Intent is to insert hooks into user interfaces, or patch functions that create or access certain user interfaces, so that an indication of user intent can be added to whatever action the user indicated via the user interface.

A related method of detecting User Intent depends on the fact that certain operating system services may be used exclusively or almost exclusively by user interface components that are presented to the user. An example of this is the shell32 library in Win32 systems. In this case, it is sometimes possible to hook a selected set of the APIs exposed by such a library or libraries, to add indication of User Intent to any actions performed by invoking these libraries.

Another method for detecting and indicating User Intent is to change operating system APIs to make them natively support the detection and indication of User Intent. An example would be to demarcate a set of APIs as being only intended for actions that include User Intent.

For secure detection of user intent, the security solution must first ensure that detection of User Intent preferably takes place in a context where code in the Isolated Context cannot interfere, e.g. in the Isolated Context. Then, the indication of User Intent preferably is either not accessible/changeable by the Isolated Context, or if it is, then it preferably is sealed e.g. cryptographically so that the Isolated Context can not forge it or tamper with it.

To detect User Intent without a possibility of interference from the Isolated Context, one method is to modify certain user interfaces so that all or a part of them actually is displayed in a separate process running in the Protected Context. As other parts of the overall solution prevent the Isolated Context from interfering with processes running outside the Isolated Context, this may be sufficient.

Another method of detecting User Intent securely would be to ask the user in a secure way (e.g. using a user interface running in the Protected Context) whether he/she intended the action (along with a description of the action). However, this may be considered insecure because the frequency of such questions could likely cause the user to answer yes every time.

The following methods may be used to indicate User Intent in a way that the Isolated Context can not tamper with:

If the action requested is being performed on a named entity, store the name of the entity in a table not accessible by the Isolated Context, but accessible by whatever part of the system performs the action. Remove the name from the table once the action has been performed, or a short time after the action is performed for the first time.

If the action requested is being performed on a named entity, change the name of the entity to include a cryptographically sealed capability. In whatever part of the system that performs the action, start by checking the capability, and removing the capability part of the name to get the original name.

Store a cryptographically sealed capability for the requested action, in the process in Isolated Context that the user is using.

Temporarily change permissions (via operating system security) on named entities, to make them accessible to the Isolated Context.

Or by temporarily tagging entities (using one of the tagging methods discussed above) to indicate that the Isolated Context has access to the entity by User Intent. This relies on the Isolated Context not having the right to add such tags.

The cryptographically sealed capability can for example be the 4-tuple (process, action, name of target entity, expiry time) encrypted with a per-session secret known to the system (but not accessible from Isolated Context). Note that it is possible to store more restrictive capabilities, including in the encrypted n-tuple things such as allowable parameters for a given system API, etc.

Another way of detecting User Intent securely would be to change the operating systems implementation of common user interface dialogs, and/or to change applications' implementation of user interface dialogs, so that the dialogs would always be displayed in a secure context (e.g. the Protected Context) regardless of the execution context of the application itself, and so that User Intent would be indicated by one of the means discussed above.

The preferred embodiment of a method for Insecure User Intent Detection is to use Shell Namespace and dialog hooks and indication via modification of file paths. In Microsoft Windows 2000 and later, we discovered that the APIs exported from the shell32 system library are used almost exclusively by user interfaces that the user uses to specify actions to perform on files and other items in the shell namespace. This makes it an ideal place to detect and inject User Intent as discussed above.

The shell namespace is composed of binary paths called pseudo interface description languages (PIDLs). For any PIDL that represents a filesystem object, it is possible to retrieve a filesystem path. The method we use to detect and indicate user intent is to intercept the shell32 APIs to insert a user intent path prefix into any filesystem path the shell32 APIs return or use to call other system libraries. To ensure that the shell functions as expected when asked to convert a filesystem path back into a PIDL, we intercept other shell32 APIs to ignore the user intent path prefix when parsing filesystem paths. This makes the change transparent to applications that use the shell APIs. In the security solution filesystem filter driver, we check for the user intent path prefix, mark a flag as true if it is present, and remove the user intent path prefix before passing the filesystem path through the security solution filter. This may make the change transparent to the rest of the operating system, but allows the security solution implementation to take different actions based on whether a file is created/opened/read from/written to with User Intent or without. The shell namespace intercept described in this paragraph is implemented by patching several shell32 functions, including the following:

| Function Name | Purpose |
| --- | --- |
| SHGetDesktopFolder | Patched in order to be able to patch all IShellFolder and IPersistFolder3 instances |
| IShellFolder::ParseDisplayName | Patch makes function ignore user intent path prefix when parsing filesystem paths |

-continued

| Function Name | Purpose |
| --- | --- |
| IShellFolder::GetDisplayNameOf | Patch inserts user intent path prefix into filesystem paths when they are requested |
| IPersistFolder3::Initialize | Inserts a user intent path prefix into the path that the folder is being initialized with. |
| SHGetPathFromIDList | Inserts a user intent path prefix into path returned |
| SHILCreateFromPath | The patch makes the function ignore user |

A few types of usage of common user interfaces may not be covered by the above method. This includes the case where the user types in a full pathname in the common open/save dialog boxes provided by Windows, and the case where the user attempts to save to the My Documents or Desktop folders from within a Microsoft Office or XP application. To catch the former, we patch the GetOpenFileName and GetSaveFileName APIs, making them add the user intent path prefix to any path returned. To catch the latter, we change the Windows Registry for the Isolated Context so that the locations where Microsoft Office applications read the paths for the My Documents and Desktop folders from always has a path with the user intent path prefix already inserted.

It is worth noting that all of the measures described in this section are taken for processes running in the Isolated Context. For processes running outside the Isolated Context, it is safe to assume that everything is done with User Intent, as we assume that there is no malicious code outside the Isolated Context.

Secure User Intent detection is enabled by proxying IShellView to Protected Context and indication by storing capabilities outside Isolated Context. More or less all common file open/save dialogs in Microsoft Windows 2000 and later, and most application programs, use the same implementation of the well-defined IShellView interface to display the list of files in a folder and allow the user to choose from that list. Moreover, the user interface component of this implementation (the actual window) is created in a well documented way, using the IShellView::CreateViewWindow method. This makes for an ideal place to detect User Intent in a secure fashion.

The implementation of this detection involves vtable patching all IShellView interfaces. On calls to IShellView::CreateViewWindow in the Isolated Context, the original implementation of this method is allowed to complete, and then a window equivalent to the window created by the original implementation, is created in the Protected Context. By equivalent we mean same size, same settings, initialized to same folder, and it is made a child window of the window created by the original implementation, sitting on top of that window, moving with that window, and resizing with that window, so the underlying window is preferably not seen by the user.

In the overlayed window in the Protected Context, the security solution will create an IShellView using the same IShellView::CreateViewWindow method. The security solution will then allow the user to interact with that window to choose a file or file(s), browse between directories, etc. Once the user has chosen a file or files, the security solution will grant the process that owns the underlying window in Isolated Context the capability to perform actions on those files with User Intent. It will then use the original IShellView interface (in the Isolated Context) to programmatically select the same files in that view.

The indication of User Intent is done by making an entry in a table that is at least writable from Protected Context, and that is fully controllable from kernel mode. The entry contains the process ID of the process that should be granted the capability of manipulating the file(s) with User Intent, the name of the file(s) that this capability applies to, and an expiration time (which is within a very short time). The security solution kernel mode intercepts read this table when Isolated Context processes attempt to perform actions on files, to see if the actions should be performed with User Intent or not.

In many cases, the user interface the default implementation of IShellView creates for browsing folder contents, choosing files etc., may be accompanied by a drop-down list for choosing a directory, drive or network place to browse, and by an edit box where the user can type in path names, or full names. To prevent the Isolated Context from fooling the user into selecting files from a different folder than intended, these controls preferably are either proxied over into the Protected Context in a similar way as described above for the IShellView folder browser, or they should be disabled and any changes they request on the folder browser be ignored. In the latter case, to give the user back the functionality provided by these two controls, the security solution overlay window can contain not just a folder browser, but also a dropdown box and an edit control, that behave similarly to the ones in the default file open/save dialog boxes.

Thus, it should be evident that the embodiment described in this section fits into the category of Secure Detection and Indication of User Intent, because there is no way for Isolated Context to interfere with the user interface that gathers the file(s) the user intends to perform an action on, or to forge the fact that the user is interacting with this user interface, because other parts of the security solution system prevents processes running in the Isolated Context from accessing windows outside the Isolated Context; and, there is no way for Isolated Context to forge the indication of User Intent, because the table that stores the capability entries is not accessible from the Isolated Context.

User Intent can also be detected using a security solution Kernel mode implementation, similar to the way that the kernel is used to deal with restricted or mangles files, as discussed previously. User-intent is provided from User Mode in filesystem paths, that require special handling. User Intent shows up as a token in the path (currently "\GB\") that is being requested in the process. This section documents the support that Kernel Mode provides to detect user-intent and strip it so it can properly get serviced, the latter task also involves controlling the creation-of and access-to restricted files. This process assists the User Intent processing components by stripping User Intent in the kernel, while maintaining security for Restricted file creation/access, in the worst case denies access, when creation time race conditions occur.

The Kernel Mode user-intent processing operates for the following IoManager IRPs: Create, Close, DirectoryControl. The following is supported both for local volumes, and network volumes (specifically LanmanRedirector on NT filesystems). For Create dispatch processing, if user-intent is detected in the path, then the access context may be checked and User Intent is not serviced for. For The Isolated Context accesses, the accesses path is checked to see if it points to a normal file, in which case standard filesystem policies will be applied (i.e. Shared/Disclosed/Confidential). However, If there is no existing file at that path, or the file is a Restricted file, then the request is sent into the FSD, all time-to-check vs. time-to-access race conditions are handled on the completion side.

Similarly for Create completion processing, if the original access was done under user-intent, then the IoStatus information may be checked to see whether the Create resulted in a file-creation. Then, if a new file was created, the completion processing code attempts to mangle the file. If this is unsuccessful, then the Create may be aborted, the file-object is closed, and the process may be denied access to this file. However, if an existing file was opened, then the completion processing may ensure that the file is Restricted. If the file is Restricted, then the calling process may get unmangled access. Otherwise the calling process may be denied access to the file. Directories created under user-intent are always allowed access. However delete access to them may not be allowed. This newly created file-object, which has been accessed via user-intent may be kept in a data structure, so relative opens can be supported.

For close completion processing, the in-memory data structure of user-intent file objects may be cleaned up here.

Finally, for directory Control Dispatch processing, if the Isolated Context process is querying for the presence of the User Intent directory, then simulate the presence of this directory. Wild cards are typically not supported for this query, and the user-intent directory name is preferably Microsoft 8.3 filename compliant, since synthesis of an 8.3 will be a non-trivial task in this case.

The method employed by the security solution to secure the internal enterprise network is novel, allowing simultaneously a high degree of security and usability, while sidestepping many of the problems and pitfalls with other products and technologies that also aim to protect enterprise networks.

The main benefit is that the security solution allows users to access external or untrusted content, while simultaneously isolating the content and all executables touching it, inside a restricted environment. From a security perspective, it is almost as if the content had remained outside the enterprise perimeter.

By comparison to current methods for maintaining enterprise security, for example, AV products, the security solution will maintain the integrity of the internal enterprise network, and the executables and configuration of the workstation, even in the cases where malware infects the network.

It is however to be noted, that a nice synergy exists between the security solution and AV scanners, since when its necessary or desirable to move external content to the internal network, such content should to be scanned to protect against malicious infections spreading to the enterprise intranet.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for providing transparent isolation from untrusted content, comprising:
   identifying the origin of content;
   tagging the content with an indication of whether the content is trusted content or untrusted content;
   creating a restricted execution environment for the isolated execution of the content when the content is untrusted content;
   creating a virtual environment, wherein creating said virtual environment comprises providing untrusted content with a virtualized view of resources of a local environment such that untrusted content executed in the restricted execution environment is able to access resources needed for successful execution without actual access to said resources of said local environment; and consolidating user interfaces between the restricted execution environment and the local environment to allow users to seamlessly work with both trusted and untrusted content wherein tagging the content comprises affixing a file of the content with a descriptive header or footer, wherein the header or footer carries auxiliary information, including the origin of the content and the modification history of the file.

2. The method of claim 1, wherein the content includes:
email messages and attachments, internet content and data, content originating through TCP/IP based transports, and external files.

3. The method of claim 1, wherein tagging the content comprises:
tagging the content upon transmittal of the content to an external agent.

4. The method of claim 1, wherein tagging the content comprises:
tagging content upon creation or upon transmittal to an internal agent.

5. The method of claim 1, wherein identifying the origin of content comprises:
determining the destination of the content.

6. The method of claim 5, wherein determining the destination comprises:
parsing the headers of content to determine the routing path for the content.

7. The method of claim 1, wherein identifying the origin of content comprises:
ascribing an external origin to content that originates from an external internet protocol address; and
ascribing an internal origin to content that originates from an internal internet protocol address.

8. The method of claim 1, wherein identifying the origin of content comprises:
ascribing an external origin to content that creates files in the restricted execution environment; and
ascribing an internal origin to content that creates files in the local environment.

9. The method of claim 1, wherein tagging the content comprises:
altering a file name of the content to contain a reference to the origin of the content.

10. The method of claim 9, wherein altering the file name of the content comprises:
adding a new prefix, infix, or suffix to the file name, or injecting a particular string into the file name apart from the prefix, infix, or suffix.

11. The method of claim 1, wherein tagging the content comprises:
modifying file attributes of the content, the file attributes being at least one of a file stream, a name-value tuple, a security descriptor, and a location tag.

12. The method of claim 1, wherein the auxiliary information further includes user execution instructions.

13. The method of claim 12, wherein tagging the content further comprises:
modifying the content through cryptographic manipulation of the file of the content such that any malicious content is rendered benign, modifications can be detected, and confidentiality can be assured.

14. The method of claim 1, wherein tagging the content comprises:
modifying the file system of the operating system to create a modified file system, wherein the modified file system natively understands tags.

15. The method of claim 1, wherein tagging the content comprises:
modifying the content through cryptographic manipulation of the file of the content such that any malicious content is rendered benign, modifications can be detected, and confidentiality can be assured.

16. The method of claim 1, wherein creating a restricted execution environment comprises:
creating an environment wherein access to local and enterprise resources are mediated.

17. The method of claim 16, wherein the resources that are mediated include:
files on the local file system, files on the network servers, the local registry, kernel entities and objects, and services on the enterprise intranet.

18. The method of claim 16, wherein mediating the local resources comprises:
limiting the amount of shared resources that the environment is allowed to consume.

19. The method of claim 18, wherein the shared resources that are limited include:
the amount of physical memory, page file consumption, central processing unit consumption, the frequency and scope of network operations, and the amount of network bandwidth consumed.

20. The method of claim 18, wherein the methods used to limit the resources include:
interposition, the creation of restricted accounts or tokens, and full-host virtualization.

21. The method of claim 1, wherein creating a virtual environment comprises:
providing an unmangled view of content in the restricted execution environment, and a mangled and obfuscated view of content in the local environment.

22. The method of claim 21, wherein providing a mangled and obfuscated view comprises:
modifying the content through cryptographic manipulation of the file of the content such that any malicious content is rendered benign.

23. The method of claim 1, wherein creating a virtual environment comprises:
presenting the restricted execution environment with a view of the resources such that any changes made to resources in the restricted execution environment are either reflected in the local environment or made invisible to the local environment.

24. The method of claim 1, wherein providing the untrusted content a virtualized view of local resources comprises: optimizing a file system copy method.

25. The method of claim 1, wherein consolidating user interfaces comprises:
providing a visual indication of untrusted content executed in the restricted execution environment.

26. The method of claim 25, wherein providing a visual indication of untrusted content comprises: framing a display of the untrusted content with a customizable color.

27. The method of claim 1, wherein consolidating user interfaces comprises:
simultaneously displaying content executed in the restricted execution environment and content executed in the local environment.

28. The method of claim 27, wherein a visual indication of untrusted content executed in the restricted execution environment is provided by framing a display of the untrusted content with a customizable color.

29. The method of claim 1, further comprising:
determining whether an action performed on a resource is initiated with the intent of the user.

30. A system for maintaining the security of an enterprise network by providing transparent isolation from untrusted content, comprising:
a content origin identifying means;
a means for tagging content as trusted content or untrusted content;
means for creating a restricted execution environment for the isolated execution of untrusted content;
means for creating a virtual environment, wherein said means for creating a virtual environment comprises means for providing untrusted content with a virtualized view of resources of a local environment such that untrusted content executed in the restricted execution environment is able to access resources needed for successful execution without actual access to said resources of said local environment; and
means for consolidating user interfaces between the restricted execution environment and the local environment to allow users to seamlessly work with both trusted and untrusted content, wherein the means for tagging affixes a file of the content with a descriptive header or a descriptive footer, the header or footer carrying auxiliary information including the origin of the content and the modification history of the file.

31. The system of claim 30, wherein the content includes:
email messages and attachments, internet content and data, content originating through TCP/IP based transports, and external files.

32. The system of claim 30, wherein the means for tagging the content tags content upon transmittal of the content to an external agent.

33. The system of claim 30, wherein the means for tagging content tags content upon creation or upon transmittal to an internal agent.

34. The system of claim 30, wherein the means for identifying further comprises:
means for determining the destination of the content.

35. The system of claim 34, wherein the means for determining the destination of the content parses the header of content to determine the routing path for the content.

36. The system of claim 30, wherein the identifying means ascribes an external origin to content that originates from an external internet protocol address and ascribes an internal origin to content that originates from and internal internet protocol address.

37. The system of claim 30, wherein the means for identifying ascribes an external origin to content that creates files in the restricted execution environment and ascribes an internal origin to content that creates files in the local execution environment.

38. The system of claim 30, wherein the means for tagging further comprises:
means for altering a file name of the content.

39. The system of claim 38, wherein the means for altering the file name adds a new prefix, infix or suffix to the file name.

40. The system of claim 38, wherein the means for altering the file name injects a string into the file name.

41. The system of claim 30, wherein the means for tagging modifies file attributes of the content.

42. The system of claim 41, wherein the file attributes include:
a file stream, a name-value tuple, a security descriptor and a location tag.

43. The system of claim 30, wherein the means for tagging further comprises:
means to create a modified file system that natively understands tags.

44. The system of claim 30, wherein the means for tagging comprises:
means for modifying the content through cryptographic manipulation of the file of the content such that any malicious content is rendered benign, modifications can be detected, and confidentiality can be assured.

45. The system of claim 30, wherein the means for creating a restricted execution environment further comprises:
means for mediating access to local and enterprise resources.

46. The system of claim 45, wherein the resources that are mediated include:
local files, enterprise files, the local registry, kernel entities and objects, and services on the enterprise intranet.

47. The system of claim 45, wherein the means for mediating access further comprises:
means for limiting the amount of shared resources that the restricted execution environment is allowed to consume.

48. The system of claim 47, wherein the shared resources include:
physical memory, page file consumption, central processing unit consumption, the frequency and scope of network operations, and the amount of network bandwidth consumed.

49. The system of claim 48, wherein the means for limiting the amount of shared resources includes:
interposition means, means for creating restricted accounts and tokens, and virtualization means.

50. The system of claim 30, wherein the means for creating a virtual environment provides an unmangled view of a resource in the restricted execution environment created by the means for creating a restricted execution environment, and a mangled, obfuscated view of a resource in the local environment.

51. The system of claim 50, wherein the mangled, obfuscated view is provided by means for modifying the content through cryptographic manipulation of the file of the content such that any malicious content is rendered benign, modifications can be detected, and confidentiality can be assured.

52. The system of claim 30, wherein the means for creating a virtual environment further comprises: means for presenting the restricted execution environment with a view of the resources such that any changes made to resources in the restricted execution environment are either reflected in the local environment or invisible to the local environment.

53. The system of claim 30, wherein the means for creating a virtual environment optimizes a file system copy method to supply said virtualized view of the resources.

54. The system of claim 30, wherein the means for consolidating user interfaces further comprises:
means for providing a user a visual indication of untrusted content executed in the restricted execution environment.

55. The system of claim 54, wherein the means for providing a user a visual indication frames a display of the untrusted content with a customizable color.

56. The system of claim 30, wherein the means for consolidating user interfaces simultaneously displays content executed in the restricted execution environment and content executed in the local environment.

57. The system of claim 56, further comprising:
means for providing a visual indication of untrusted content executed in the restricted execution environment by framing a display of the untrusted content with a customizable color.

58. The system of claim 30, further comprising:
means for determining user intent.

* * * * *